United States Patent [19]

Itoh et al.

[11] Patent Number: 5,481,698
[45] Date of Patent: Jan. 2, 1996

[54] COMPUTER SYSTEM AND JOB EXECUTING METHOD

[75] Inventors: Tutomu Itoh, Kanagawa; Toshio Hirosawa, Machida; Motohide Kokunishi, Kokubunji; Masaharu Iwanaga, Kamakura; Shinichi Endo, Yokosuka, all of Japan

[73] Assignees: Hitachi Ltd., Tokyo; Hitachi Software Engineering Co., Ltd., Kanagawa, both of Japan

[21] Appl. No.: 31,729

[22] Filed: Mar. 15, 1993

Related U.S. Application Data

[63] Continuation-in-part of Ser. No. 412,928, Sep. 26, 1989, Pat. No. 5,347,646.

[30] Foreign Application Priority Data

Mar. 19, 1992 [JP] Japan .................. 4-063060

[51] Int. Cl.⁶ .................................................. G06F 15/16
[52] U.S. Cl. ................ 395/185.01; 395/775; 395/650; 395/200.01
[58] Field of Search ............................ 395/575, 200, 395/375, 775, 800

[56] References Cited

U.S. PATENT DOCUMENTS

| 4,495,562 | 1/1985 | Yamaji et al. | 395/550 |
| 4,520,233 | 5/1985 | Smith | 379/95 |
| 4,713,780 | 12/1987 | Schultz et al. | 364/514 |
| 4,769,771 | 9/1988 | Lippmann et al. | 395/200 |
| 4,962,449 | 10/1990 | Schlesinger | 395/95 |

FOREIGN PATENT DOCUMENTS

| 64-67672 | 3/1989 | Japan . |
| 1-108830 | 4/1989 | Japan . |
| 1-267758 | 10/1989 | Japan . |

OTHER PUBLICATIONS

Journal of Information Processing Society of Japan, vol. 23, No. 6, Nov. 1982, pp. 591–597.

*Primary Examiner*—Robert W. Beausoliel, Jr.
*Assistant Examiner*—Ly V. Hua
*Attorney, Agent, or Firm*—Fay, Sharpe, Beall, Fagan, Minnich & McKee

[57] ABSTRACT

Job execution within a computer system having a plurality of host computers is handled over an electronic mail system having a terminal and server, by the use of job control processing interfacing between the computer system and the electronic mail system. Job mail comprises job offer paper mail, job execution result mail, job execution progress mail and job data mail. The electronic mail system 2 stores job mail, converts the format, etc., of the job mail, and manages the electronic mail. The job control terminal 4 converts the format, etc., of the job mail, generates commands to the computer system on interpreting the job mail, selects a host computer for executing based upon the running state and/or load, etc. of the host computers 42 of the computer system 3, generates job mail based upon execution results and execution progress from the computer system and exchanges mail between the electronic mail system and the computer system. The computer system executes jobs in response to the job commands from the job control terminal 4, with execution starting time based upon a date when provided by the job mail.

59 Claims, 22 Drawing Sheets

FIG. 2

| NO | MAIL TERMINAL FUNCTIONS | |
|---|---|---|
| 1 | REQUEST EXECUTION | 51 |
| 2 | REQUEST TRANSFER EXECUTION RESULT | 52 |
| 3 | REQUEST NOTICE EXECUTION PROCESS | 53 |
| 4 | NOTICE OF TRANSFER OF INPUT DATA | 54 |

FIG. 3

| (1) | | NAME OF JOB | 61 |
|---|---|---|---|
| | (a) | INSTRUCTIONS IN JCL | 72 |
| (2) | | REQUEST | 62 |
| | (a) | DATE | 63 |
| (3) | | RESULT | 64 |
| | (a) | CLASS | 73 |
| (4) | | DESTINATION | 65 |
| | (a) | SINGLE | 66 |
| | (b) | SIMULTANEOUS | 67 |
| | (c) | CIRCULAR | 68 |
| | (d) | DATE | 69 |
| (5) | | REQUEST PROGRESS | 70 |
| (6) | | REQUEST DATA MAIL | 71 |

FIG. 22

| 271 | 272 | 273 | 274 | 275 |
|---|---|---|---|---|
| SUBMIT | JOB NAME | MAIL | ID | METHOD |

| 281 | 282 |
|---|---|
| JOB CLASS | JOB TAT |
|  |  |
|  |  |

| 283 | TAT | | | 284 |
|---|---|---|---|---|
| JOB CLASS | TAT1 | TAT2 |  | TATn |
|  |  |  |  |  |
|  |  |  |  |  |

FIG. 25

| | | | |
|---|---|---|---|
| (1) | JOB NAME | | ~272 |
| (2) | ID | | ~274 |
| | (a) | SINGLE | ~275 |
| | (b) | SIMULTANEOUS | |
| | (c) | CIRCULAR | |
| | (d) | DATE | |

FIG. 26

| 291 | 292 |
|---|---|
| ID | ID |
| Mxxxx | Hyyyy |
| | |
| | |

COMPUTER SYSTEM AND JOB EXECUTING METHOD

The present application is a continuation-in-part of U.S. Ser. No. 07/412,928 filed Sep. 26, 1989, now U.S. Pat. No. 5,347,646.

BACKGROUND OF THE INVENTION

The present invention relates to a computer system using an electronic mail system for executing a job.

There are the following electronic mail systems analyzed by the present invention: (1) SYSOUT data, i.e., a job execution result is asked by electronic mail on a host computer and registered in a mail box of a distribution destination, as disclosed in Japanese Patent Laid-Open No. 108830/1989; (2) a job execution is requested for a host manager by electronic mail so that an execution result mail is distributed by a host computer, as disclosed in Japanese Patent Laid-Open No. 67672/1989; and (3) the execution of a job and the distribution of the execution result are requested for a host computer by electronic mail through an electronic mail system independent of the host computer, Japanese application Laid-Open No. 01-267758.

SUMMARY

The parent application, mentioned above, uses a monitoring circuit interposed between a computer and an operator console in order to monitor an error within the system including the computer. Such an error may include error of an operating system and error of the hardware of the computer system. The monitoring is based upon messages transferred between the operator console and the computer. In the event that an error has been detected, a remote operator console is called via a public telephone network, and in response to such call an operator at the remote operator console can send commands to the computer via the telephone network in order to provide an appropriate response to such error. A monitoring circuit is provided for each of a plurality of computer systems. Each combination of a monitoring circuit and computer system is connected to a public telephone communication network. A remote operator console or remote terminal or remote computer system or one of the computer systems themselves operating over the public network may control operations of the plurality of computer systems. Each of the monitoring circuits is capable of detecting the above-mentioned error in its associated computer system.

The aforementioned prior art Japanese Laid-Open No. 108830/1989 is constructed such that the electronic mail system operates with an EDP system. A job request is given by a requesting person in terms of a request mail, which includes a name of a job to identify results of execution, a name of a receiving person to receive the results of execution, a name of the requesting person who issued the request mail, a data portion to be delivered with the result of executing the job, and a timing for the delivery of the result. When the job has been executed, a portion of the result of execution designated by the request mail is transmitted to the receiving person according to timing, as received mail that includes the name of the requesting person, a timing of receipt of the mail and an address where the results of execution are held in the EDP system. The received mail is then displayed on a display at a terminal of the receiving person together with other mail that have been addressed to the receiving person. When the receiving person requests receipt of the results of execution through the terminal, the results of execution are transferred from a location corresponding to the address within the EDP system to the receiving person's terminal. This construction raises the following problems. For example, the mail terminal has to be defined in advance on the computer, and a mail offer is dependent upon the running time of the computer system, i.e., the running time of the system, so that the requester always has to be conscious of the running time of the host computer.

The aforementioned Japanese patent Laid-Open No. 67672/1989 discloses a system where a job request is given in terms of request mail from a requester to a host operator of a host computer that the requester uses. The request mail includes a name of the receiving person, a mail ID of the receiving person, items requested, and items of results to be delivered. The mail is quickly transferred to the host computer and the requested job is executed. The items of the results of execution identified in the request mail are then used in the automatic generation of result send mail, which is then mailed to the receiving person, in accordance with the registering of the job within the host computer. This disclosure does not refer specifically to a mail system, unlike the above-mentioned '830; '672 includes the results within the result mail in contrast to merely indicating an address where such results may be obtained. Such disclosure is defective in that manpower is necessary because the decision of accepting a job execution requesting mail is performed by a host manager.

The aforementioned Japanese Laid-Open patent application No. 01-267758 relates to an electronic mail system wherein a job request is given in terms of request mail that includes a program name, data to be processed by the job and an address to which the results of job execution are to be delivered. A computer that has received the request mail analyzes the request mail to find a job to be executed and then proceeds to execute the job. The results of job execution are then transferred. A network of terminals is shown whereby mail may be circulated among a plurality of people, as a combination of a mail system and an EDP system. The results of execution are sent with the result mail in contrast to '830 wherein only the address of the results is sent with the result mail. The aforementioned is free from the above-specified problems but has failed to touch several items to be considered when such system is to be constructed. For example, in case there are a plurality of host computers, there arises a problem of what host computer is used to execute the mail job requested. Another problem is how host computer trouble is to be remedied.

An object of the present invention is to provide an electronic computer system solving the practical problems arising when requesting the execution of a job by using electronic mail.

According to the present invention, for achieving the above-specified object, the system is constructed of a mail terminal, an electronic mail system, a computer system for executing a job, and a job control for monitoring the run of the computer system.

At the mail terminal, the user (a person or program) issues job offer mail for job execution, and the job electronic execution progress and result of the job execution is received by electronic mail (the electronic mail concerning a job will be called the "job mail"). The job offer mail is stored with job executing instructions, such as one or more of a job execution request issued by the user, a request for receipt of the job execution result, a receiving method (e.g., the distribution of single/simultaneous/circular), a request for receiving job execution progress, and a request for sending data mail as the input data to the job.

The electronic mail system includes a computer, a group of mail terminals and job mail storage. The electronic mail system has a format conversion table for converting format or code between that used by the host computer and that used by the individual mail terminals, to convert the job execution result into data which can be referred to by the individual mail terminals. A job control system interprets job mail to issue a control command to a computer system, and receives the job execution result and job execution progress data from the computer system to generate job mail for informing the job requester of results and progress. Since the job control system is constructed to operate independently of the computer system host computers, it can receive a job offer mail at any time independent of the running of the host computers (that is act as a job receiving server). Since the mail operations of the computer system are managed altogether by an external device, the job control terminal can execute and select another running computer when the previously selected computer is troubled or contracted for other execution. In order to shorten the TAT (i.e., Turn Around Time: the time period from the receipt of a command for execution of a job to the end of the execution within a host computer) of the job offered by the job mail, moreover, an execution host computer is selected according to a load, the TAT of executing prior jobs, for each running host computer. The computer system interprets a job execution command issued from the job control terminal, receives data mail as input data at the job execution time from the mail terminal, starts a job on an appointed date, distributes the progress of the job execution at a constant time interval, and passes the execution result at the end of the job execution to the electronic mail system by way of the job control terminal.

Mail exchange is interposed between the electronic mail system and the computer system for realizing the series of steps described above. Instead of having the job control terminal, the job control system may include a dedicated or use of a host computer in addition to its interfacing software so that the electronic mail system communicates directly with the computer system, with job control software and storage interfacing, to decide the running state of the computer system. Since the offer of the job is accomplished for the electronic mail system by making use of the job mail, it is unnecessary to use a terminal defined on the computer system. Thus, the present invention does not require that a job offer is limited to an area of a computer system as a defined terminal in the computer system.

The result or progress mail distribution destination of the job execution is instructed, when a job is requested, by a TSS (i.e., Time Sharing System) terminal connected with the computer system. At the end of the job execution, job execution result is distributed to the electronic mail system by the job mail exchange or offered by the job mail.

In the present invention, an execution host computer can be selected according to the authorization, security level, execution failure, running state and load of host computers. Moreover, the execution result of a job requested by the TSS terminal can be sent by electronic mail.

BRIEF DESCRIPTION OF THE DRAWINGS

FIG. 2 is a diagram showing the job execution control of the present invention at a mail terminal;

FIG. 3 is a diagram showing appointment items of job request;

FIG. 22 is a diagram showing mail distribution appointing at a job submit time of a TSS command;

FIG. 23 is a job TAT table to be managed by a host computer;

FIG. 24 is a job TAT table to be managed by a job control terminal;

FIG. 25 is a diagram showing a receipt mail of a job execution result prepared by a SUBMIT command;

FIG. 26 is a diagram showing a construction of a mail ID/host ID conversion file.

DETAILED DESCRIPTION OF THE DRAWINGS

The present invention will be described with reference to the FIGS. 1 to 22.

Figure 1:
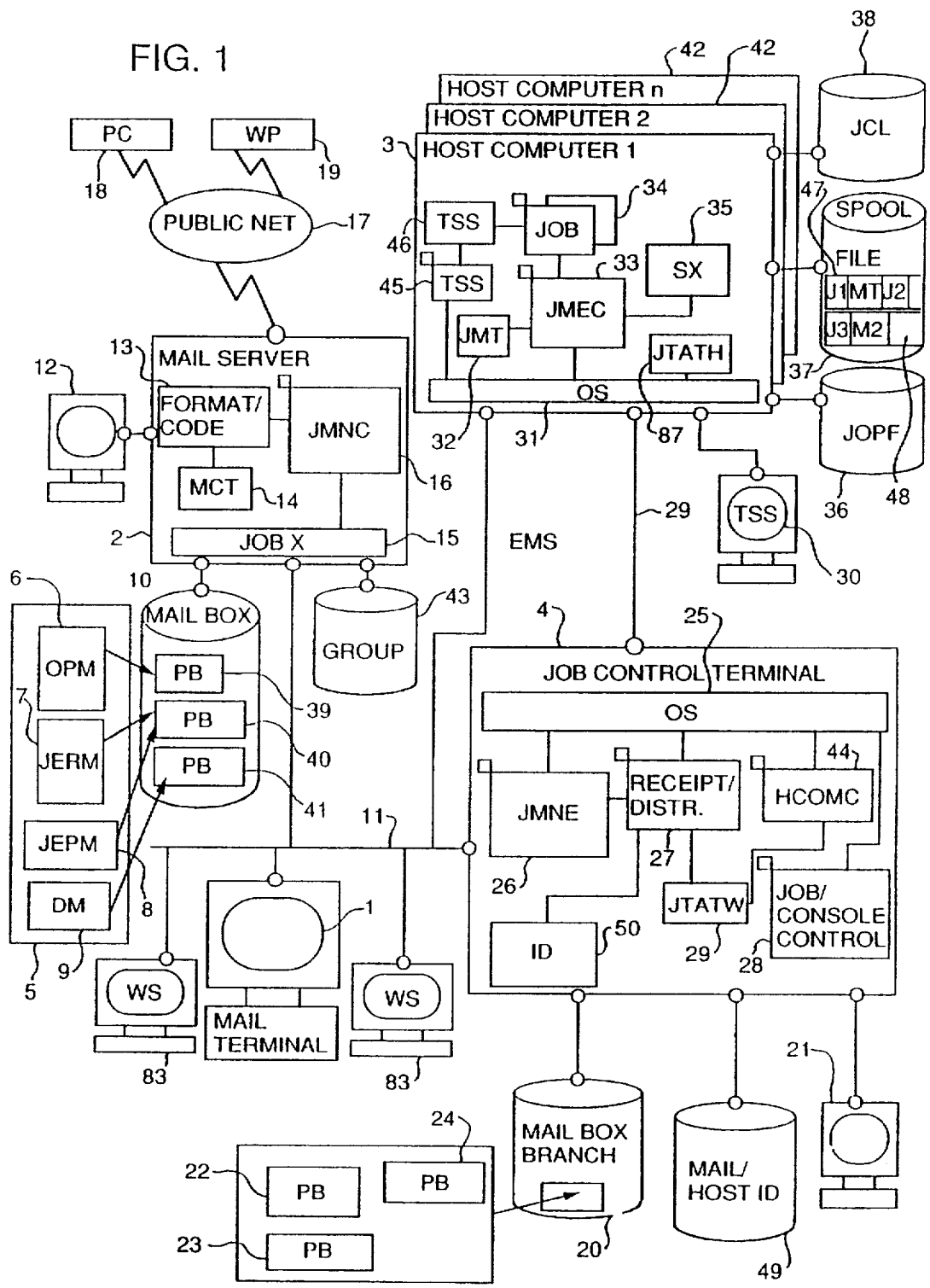
FIG. 1 is a diagram showing a system structure with an electronic mail driven type job execution control of the present invention.

FIG. 1 is a diagram showing a construction of a system with an electronic mail driven job execution control of the present invention. A mail terminal 1 for transmitting/receiving mail and an electronic mail server 2 for performing steps instructed by the mail terminal 1 are connected as an electronic mail system through a LAN 11 with a computer system 3. The computer system 3 is constructed of a group of host computers 42, and is connected to a job control system having a job control terminal 4 for monitoring the execution of the jobs executed by the host computers 42 and interfacing between the electronic mail system 2 and the computer system 3. The computer system 3 and the job control terminal 4 are connected by a line 29. The LAN 11 may be connected with other workstations WS 83 having no direct relation to the present invention.

The present embodiment is characterized in that the electronic mail server 2 includes a computer that is not a part of the computer system 3 and that can communicate with the job control terminal 4 through job mail over the LAN 11. The characteristic obtained with the aforementioned construction is that the job control terminal 4 monitors the running of the computer system 3, especially, the running state and the load. The job control terminal 4 uses the monitoring result to control the selection schedule of host computers 42, within the computer system 3, for executing the job requested by job mail, which job mail is issued from the mail terminal 1 and requests job execution control. Moreover, the job control terminal 4 receives the request job mail for the job execution control at all times without being influenced by, i.e., independent of, the running state and load of the computer system 3. The electronic mail server 2 can be connected with a display terminal 12 by a telephone line and through a public telephone network 17 with a variety of terminals such as a personal computer (PC) 18 that can also function as the mail terminal or a word processor (WP) 19.

A mail box 10 has private boxes for managing the job mail 5 transmitted to and received from the mail terminal 1 through the file server 2 over the LAN 11. A host addressed private box (PB) 39 stores an offer paper mail (OPM) 6 for requesting the execution control of a job. A user addressed private box (PB) 40 is provided for each user and stores job execution result mail (JERM) 7 and job execution progress mail (JEPM) 8. A job addressed private box (PB) 41 can be prepared for each job and stores data mail (DM) 9 used as input data at the job execution time. The mail 6 to 9 relates to the job execution control and will be totally called the "job mail" 5. The mail box 10 is part of a general-purpose electronic mail system and has user application mail other than the job mail 5. A group file 43 defines group membership, that is a plurality of groups with each group being defined by the members, which members may be terminals or computers, e.g., is also connected to the mail server 2 and is useful in determining distribution of job execution progress and results.

The electronic mail server 2 is constructed of: an electronic mail system (EMS) and a job network exchange routine (JOB X) 15 for exchanging job mail 5 with the job control terminal 4 over LAN 11; a mail format/code conversion routine (FORMAT/CODE) 13 for conversion between the format (structure) and digital code of job mail 5 at the time of job mail exchange with the job control terminal 4; a mail conversion table 14 (MCT); and a routine for job mail network conversion (JMNC) 16. The routines 13 and 16 in the electronic mail server 2 are individually constructed as programs.

Connected with the job control terminal 4, there are storage devices, e.g., disk storages, including a mail box branch 20 and a mail/host ID conversion file 49, and a display terminal 21. The mail box branch 20 has, like the mail box 10 of the electronic mail server 2, a host-addressed private box (PM) 22, a job-addressed private box (PB) 23 and a user-addressed private box (PB) 24, which respectively latch contents identical with boxes 39, 41, 40, in the mail format and the code system of the electronic mail. The mail box branch 20 latches only the job mail 5.

The aforementioned construction, in which the electronic mail server 2 and the job control terminal 4 individually have the mail boxes 10 and 20 as a part of the electronic mail system and job control system, has the following advantages: (a) The job control terminal 4 need not be conscious of the mail format intrinsic to the electric mail server 2, but may have a standard mail format (e.g., the mail format of the UNIX system ); (b) Thanks to the mail box branch 20, the job control terminal 4 may store job mail concerning the job execution control but need not be conscious of other general user mail. Moreover, in case the host computer is wholly inactive, the job mail can be pooled in the mail box branch 20 until the host computer starts its run, according to a wait state of the job control system.

The mail format includes mainly mail header information (i.e., control information other than text, for example, the name of an issuer of the job mail or requester of job execution, the name of a receiver of execution results or progress, or address information to find the above), which is different from the format of mail for a general electronic mail system.

The mail/host ID conversion file 49 stores a table providing correspondence between the mail ID when the user logs in job mail on the electronic mail server 2 issued from the mail terminal 1 and the host ID of a host computer for execution. The mail ID is used for testing a user allowance, authorization or security level of request mail concerning the job execution control, and the host ID is used for user correspondence to the host computer.

The components of the job control system in addition to the job control terminal 4 will be described in the following. An operating system (OS) 25 controls the entire job control terminal 4. The job control terminal 4 includes a display, a computer and component programs. A job/console control 28 either automatically controls a job to be executed by the computer system 3 in one mode or manages the display on console 21 for an operator controlling the entire computer system 3 in another mode. A job mail receipt/distribution unit 27 interprets the job mail 5 requested by and sent from the mail terminal 1 to issue a control command to the computer system 3, and receives the job execution result and the job execution progress data from the computer system 3 to generate job mail 5. A job mail network exchange and conversion routine (JMNE) 26 exchanges the job mail 5 within the network. A host computer operation monitor control (HCOMC) 44: (a) communicates with the OS 31 of each host computer 42 within computer system 3 to monitor the operation state of each host computer 42; and (b) manages the TAT of each job that is executed on each host computer 42, in a manner to correspond to a job class as determined by a job TAT table (JTATW) 29. The operation (a) is used to determine whether the host computer running state (idle, executing stopped, waiting, shut off, authorization, security level, errors in hardware or execution or OS) to be used as a basis to accordingly select one of the host computers 42 as an execution host when job execution is requested by the job mail received. In the operation (b), the TAT information corresponding to job classes is managed with reference to each host computer 42 and is periodically stored on the JTATW 29. The TAT information corresponding to job classes is used when the job requester is informed of the predicted job ending time by mail, and when the job control terminal 4 selects and controls the execution host computer according to the load on the computer system 3, in response to the received job mail 5 for the job execution. A user ID converter 50 uses the mail/host ID conversion file (ID) 49 to convert the mail ID of the job mail issuer to the host ID of the corresponding host computer.

The computer system 3 is constructed of a plurality of host computers 42, each having one or a plurality of TSS terminals 30. A job JCL (job control language) file 38 is a disk file for storing JCL data of the job requested for execution by the mail terminal 1; a spool file 37 stores job execution requests in input queue 47 and results in output queue 48; and a job offer paper file (JOPF) 36 stores the job offer paper mail 6 issued by the mail terminal 1. In the computer system 3, the disk files 36 to 38 are connected with the individual host computers 42 and are commonly used. Here, J1 to J3 designate ordinary batch jobs whereas M1 and M2 designate jobs requested by job mail, and these jobs M and J can be mixed in the queues 47, 48.

The programs of the computer system 3 include: an OS 31 for controlling the host computer for each host computer system; a job mail execution control routine (JMEC) 33 for controlling the execution of the job requested from the mail terminal 1; a code job mail table (JMT) 32 for storing a job 34 being currently executed; the TSS control 45; the TSS command 46 to be executed under the TSS control 45; a spool extraction routine (SX) 35 for extracting the job execution result from the spool file 37; and a job TAT table (JTATH) 87 for managing the job TAT for each job class.

The detail of operations of FIG. 1 will be described with reference to FIGS. 2 to 5.

The details of the functions used by the job mail execution control will be described with reference to FIG. 2, for control of sending the job execution result by mail in response to the TSS command 46. FIG. 2 tabulates a series of job execution control functions 51 to 55, which can be requested from the mail terminal 1. The function 51 is a request for executing a job in the computer system 3. The function 52 is a request for transferring the job execution result to the issuer of function 51. The function 53 is a request by the issuer of function 51 for notice of the progress of the job being executed in the computer system 3. The progress is reported at constant time intervals. The function 54 is a request for the host computer 42 to access the job-addressed private box 41 of the mail box 10 of FIG. 1 for data mail 9 to be used as input data in the execution of the job to be executed in the computer system 3. The functions 51–54 described above are the job execution control functions requested by the mail terminal i and one or more of them may be included in the format of the job offer mail 6 as shown in FIG. 3.

FIG. 3 shows details of the job offer paper mail 6 of the host-addressed private box 39, that is, a specific offer of the request functions of FIG. 2. Part (1) of each offer paper mail 6 has the job name 61 of a job requested to be executed, and the contents 72 of instructions for the execution in the computer JCL (i.e., Job Control Language). The JCL can be used to appoint a plurality of items such as the name of the program for specifically instructing the execution or the data used at the program executing time. The JCL is effective especially in case of executing an amorphous business program or in case of appointing the execution control parameters or the like of the program directly. The contents 72 can be omitted, and then the job instructions in JCL corresponding to the job name 61 is extracted from the job JCL file 38. The job name 61 may be the data set name stored with the execution JCL. In parts (2) and (3), there are the job execution request field 62; the job execution date field 63, which is effective in case the job execution request field 62 is set; the job execution result requesting field 64; and the output job class field 73 for use in comparing and holding TAT data of job executions in the computer system 3. In part (4) there is the destination field 65 for holding the result distribution destination in case the result field 64 is set, and fields 66 to 68 that designate the distribution types (namely the single report distribution field 66, the simultaneous report distribution field 67, and the circular distribution field 68) and receipt date field 69. Field 70 designates a request for receiving the progress of the job execution, and field 71 designates a request for sending the data mail 9 to the host computer to use in executing the job. The job execution requesting fields 62, 64, 70 and 71 can be set independently of one another.

Figure 4:
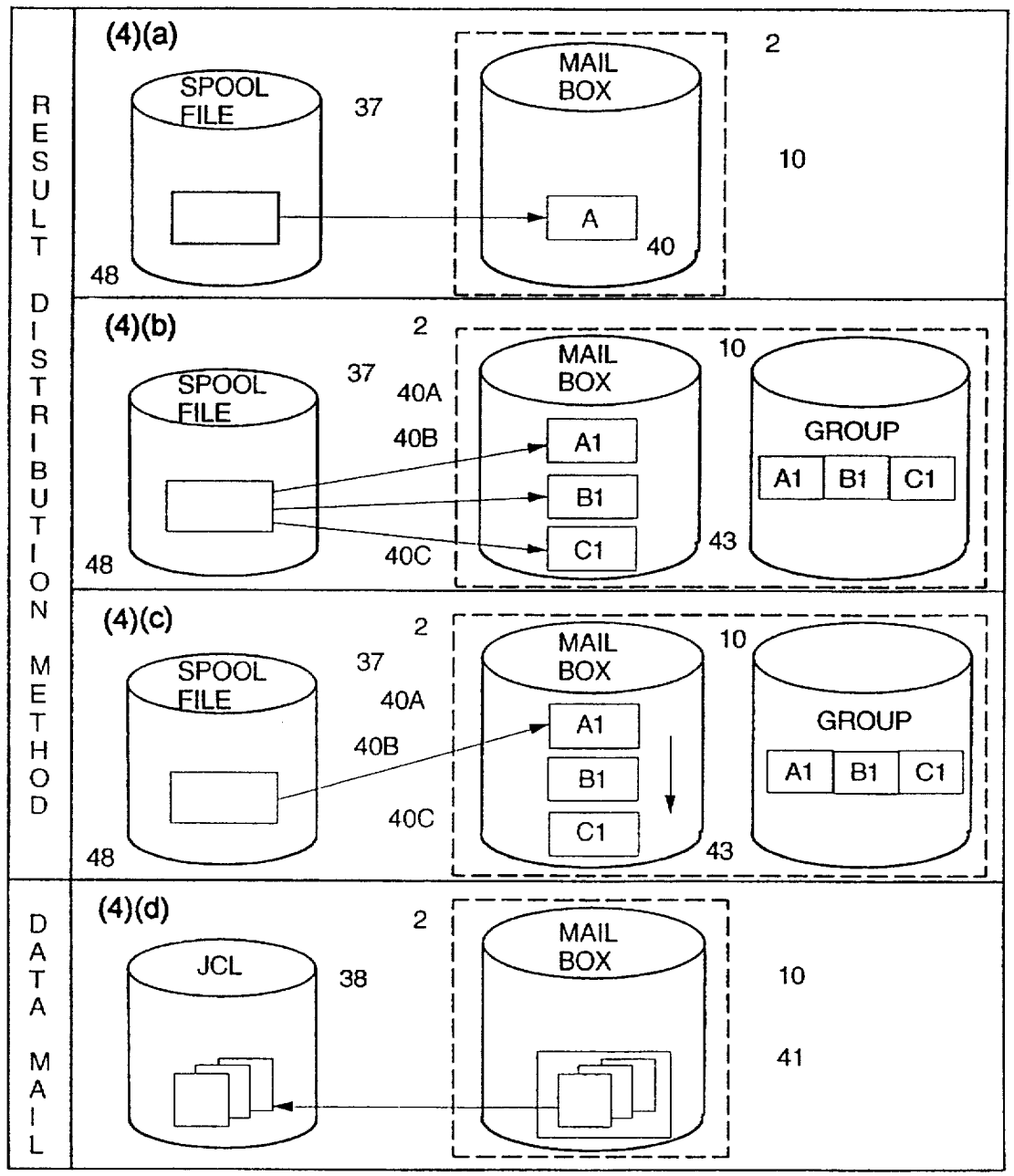
FIG. 4 is a diagram for explaining receiving a job execution result and sending mail data.

With reference to FIG. 4, the job execution result mail four distribution types (4)(*a*)–(4)(*d*) shown in FIG. 3, which may be requested in the job offer paper mail 6, will be described in detail. In the single report distribution as set in field 66, the job execution result stored in output queue 48 of the spool file 37 is transferred to user-addressed private box 40 of the mail box 10 connected with the electronic mail server 2 as job execution result mail 7. The distribution destination is set by the distribution destination name 65 described with reference to FIG. 3. In the simultaneous distribution (4)(*b*), the job execution result stored in output queue 48 is transferred to each of user names A1, B1, C1 appointed by a distributing destination group name stored in the group file 43, so that the user private boxes 40A, 40B, 40C of the mail box 10 simultaneously store the job execution result mail 7. The distribution destination group name is set in the distribution destination name field 65 of FIG. 3. In the circular distribution (4)(*c*), the distribution destination is set as in the simultaneous distribution by the group name of the group file 43, and the job execution result mail 7 is stored in the private box 40A of the first user name A1. As instructed for the next user B1 in the electronic mail system with reference to the job execution result mail 7 stored with the user A1, the job execution result mail 7 is then stored in the private box 40B of the user B1 independently of the job control system. The distribution is then made to a next user C1 by similar procedures. The user A1, e.g., may correct the mail receipt data field 69 when the user A1 refers to it. In the case of the mail receipt date set in field 69(*d*), the corrected date is distributed to a next user B1. The data mail 9 stored in the job-addressed private box 41 of the mail box 10 connected with the electronic mail server 2 is the input data at the time of executing the corresponding job defined in the job JCL file 38. Until the job executing timer the data mail 9 is stored in the job-addressed private box 41. The job-addressed private boxes are present in correspondence with each job. This is utilized, e.g., in case the sales slips of a branch shop are distributed by making use of the electronic mail system and totaled at the main shop of user A1.

Figure 5:
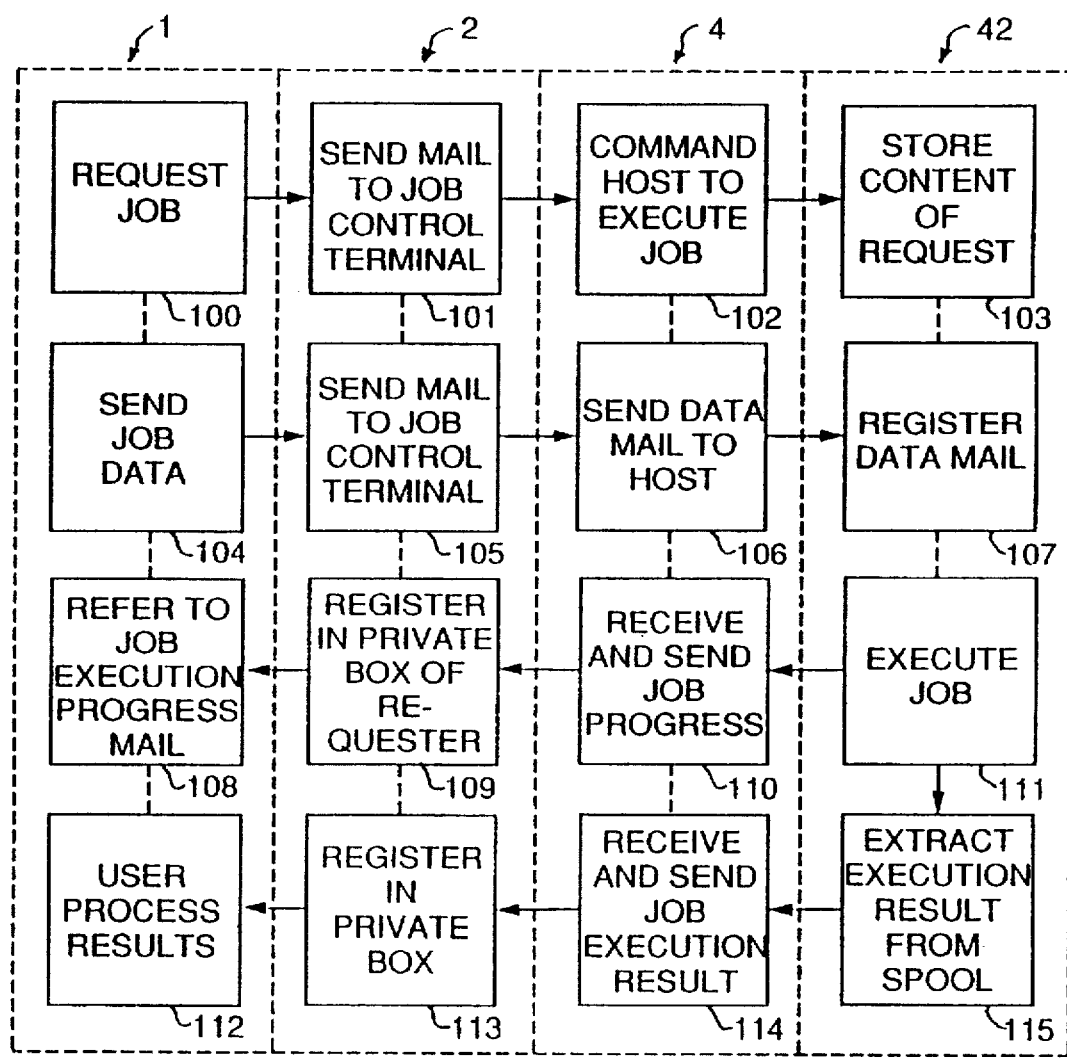
FIG. 5 is a flow chart of a system equipped with the electronic mail drive type job execution control.

The flow of the procedures of FIG. 1 will be described with reference to FIG. 5. The shared procedures of the mail terminal 1, the electronic mail server 2, the job control terminal 4 and the computer system 3 will be described separately in the following. At first, the user requests (at Step 100) a job by using the mail terminal 1. The procedure flow will be described for a series of job execution controls such as the request for job execution by job offer mail 6, the receipt of job execution result mail 7, the receipt of job execution progress mail 8, or the sending of data mail 9, all as requested by the job offer paper mail 6. The electronic mail server 2 sends (at Step 101) the host-addressed job mail 5 issued by the mail terminal 1 to the mail box branch 20 of the job control terminal 4. The job control terminal 4 interprets the job mail 5, selects a host computer 42 and issues (at Step 102) the control command to the selected host computer 42 to execute the requested job. The host computer 42 stores in a register (at Step 103) the request command content in the job offer paper file 36. The execution of the job is postponed until a specified time according to accessing of the input queue 47. Next, at the mail terminal 1, the user sends (at Step 104) the data mail 9 as the input data of the job. In the electronic mail server 2, the job-addressed data mail 9 is sent (at Step 105) to the mail box branch 20 of the job control terminal 4. This job control terminal 4 issues (at Step 106) the control command for obtaining the data mail 9 to the host computer 42. This host computer 42 registers (at Step 107) the data mail 9 as the input data of the corresponding job of the job JCL file 38. The host computer 42 extracts the JCL description of the job being executed from the job JCL file 38 at the appointed job executing time and commences (at Step 111) the execution of the job. During the job execution, the job execution progress data is sent at a constant time interval to the job control terminal 4. The job control terminal 4 receives the job progress data, and generates and sends (at Step 110) the job execution progress mail 8 to the mail box 10 of the electronic mail server 2 by the mail exchange. The electronic mail server 2 registers (at Step 109) the aforementioned job execution progress mail 8 to the user addressed private box 40 of the job requester. The user refers (at Step 108) to the job execution progress mail 8 at the mail terminal 1. The host computer 42 extracts (at Step 115) the execution result of executing the job from the spool file 37, when the job execution is ended, and generates and sends the job execution result mail 7 to the job control terminal 4. The job control terminal 4 receives the job execution result mail 7 and sends (at Step 114) the job execution result mail 7 to the mail box 10 of the electronic mail server 2 by mail exchange. The electronic mail server 2 registers the job execution result mail in the user addressed private box 40 of the corresponding user (at step 113). At this time, the format information intrinsic to the SYSOUT data is converted (at Step 113) to correspond to the format of the mail terminal 1. The user refers to the job execution result at the mail terminal 1. Moreover, the user can process the results, e.g. work on, refer to and redistribute (at Step 112) the job execution result.

The details of individual procedures will be described with reference to FIGS. 6 to 19.

Figure 6:
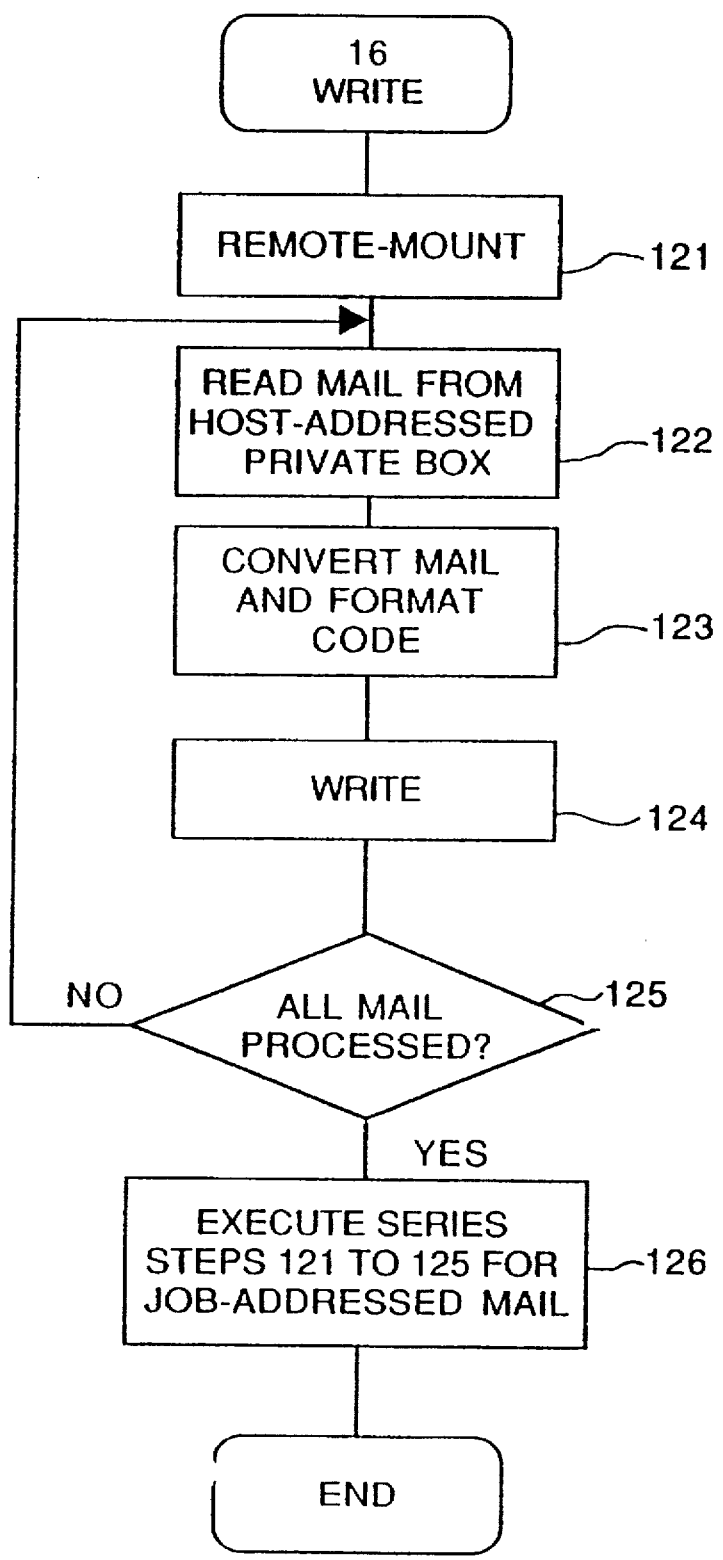
FIG. 6 is a flow chart of writing in a mail box branch according to a job mail network conversion routine in an electronic mail server.
Figure 7:
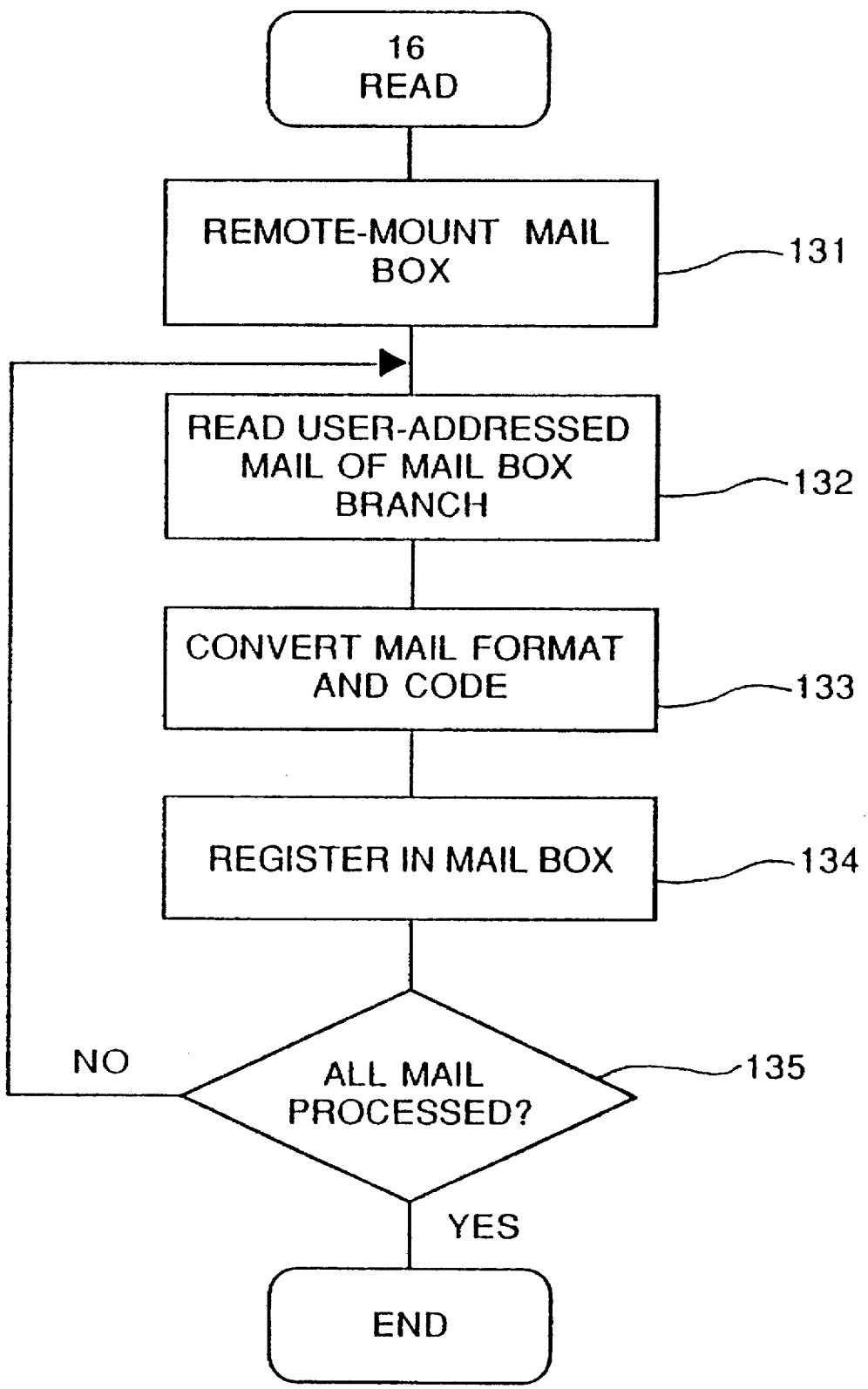
FIG. 7 is a flow chart of reading from a mail box branch according to the job mail network conversion routine in an electronic mail server.

FIGS. 6 and 7 show the procedures of writing and reading according to the job mail network conversion routine 16, which is a part of the electronic mail server 2. The job mail network conversion routine 16 of the electronic mail server 2 writes and reads the mail to the mail box branch 20 of the job control terminal 4. This routine 16 is advantageous in that the job control terminal 4 need not be conscious of the mail format intrinsic to the electronic mail server 2 (that is, the conversion of the mail format is accomplished by the electronic mail server 2). The job control terminal 4 needs to be conscious of only the mail format of the standard UNIX system, e.g., relating to mail exchange between the electronic mail server 2 and the job control terminal 4. The routine 16 is performed at constant time intervals by the electronic mail server 2.

FIG. 6 is a flow chart showing writing in the mail box branch 20 in accordance with routine 16. At Step 121, a remote mount command is issued to access the mail box branch 20 connected with the job control terminal 4, so that a file on the LAN 11 can be accessed. At Step 122, the mail is read from the host-addressed private box 39 of the mail box 10. At Step 123, the mail format/code conversion routine 13 is called to execute mail format/code conversion for the job control terminal 4. At Step 124, the converted mail is written in the corresponding host addressed private mail box 39 of the mail box branch 20 of the job control terminal 4. At Step 125, it is decided whether or not all the host-addressed mails are processed. If there is any mail left unprocessed, the processing is returned to Step 122. If all the host-addressed mail are processed, a series of steps the same as Steps 121 to 125 for job-addressed mail are executed at Step 126.

Next, in FIG. 7, the routine 16 to read from the mail box branch 20 is executed. At step 131 a remote mount command is issued to the job control terminal 4 to ask permission to access the mail box branch 20 of the job control terminal 4 or the mail box 10 of the mail server 2. At Step 132, the mail is read from the user-addressed private box 24 of the mail box branch 20, or the mail is read from the user-addressed private box 40 of the mail box 10. At Step 133, the mail format/code conversion routine 13 is called to execute mail format/code conversion for the electronic mail server 2. At Step 134, the converted mail is registered in the corresponding private box of the mail box 10 of the electronic mail server 2. At this time, the registration in the private box is accomplished on the basis of the set distribution method (e.g., single, simultaneous and circular). In case of the single distribution, the mail is stored in the user private box of the distribution destination set in field 65, as has been described with reference to FIG. 3. In case of the simultaneous distribution, the mails are simultaneously stored in the individual user private boxes belonging to the group name set in the distribution destination field 65. In case of the circular distribution, the mail is stored only in the first user private box belonging to the group name set in the distribution destination field 65, and it is stored in the next user private box when the first user refers to or corrects the mail and instructs the distribution to the next user. The steps thus far described are the procedures of the distribution method. After this, it is decided at Step 135 whether or not all the user-addressed mails have been processed, i.e. read. If there is a mail left unprocessed, the routine is returned to Step 132. If all the user-addressed mails are processed, the procedure is ended.

By the aforementioned procedures of FIGS. 6 and 7, the mail exchange between the electronic mail server 2 and the job control terminal 4 is realized.

Figure 8:
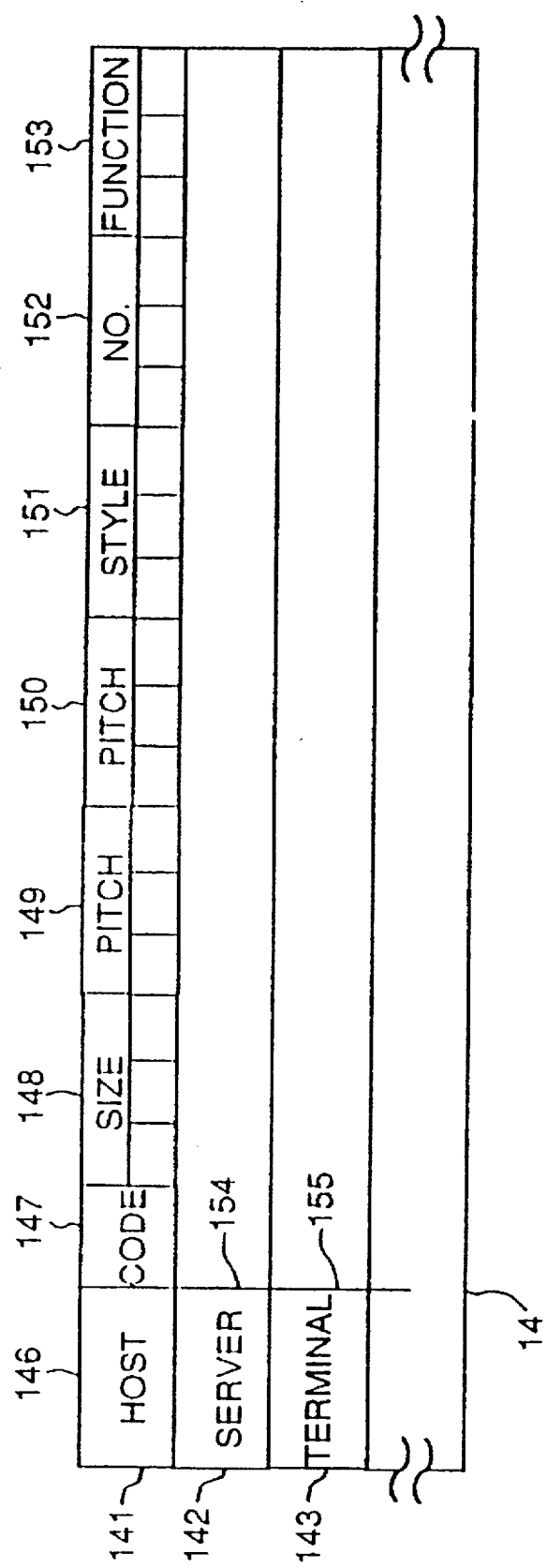
FIG. 8 is a diagram showing a construction of an MCT (Mail Conversion Table)
Figure 9:
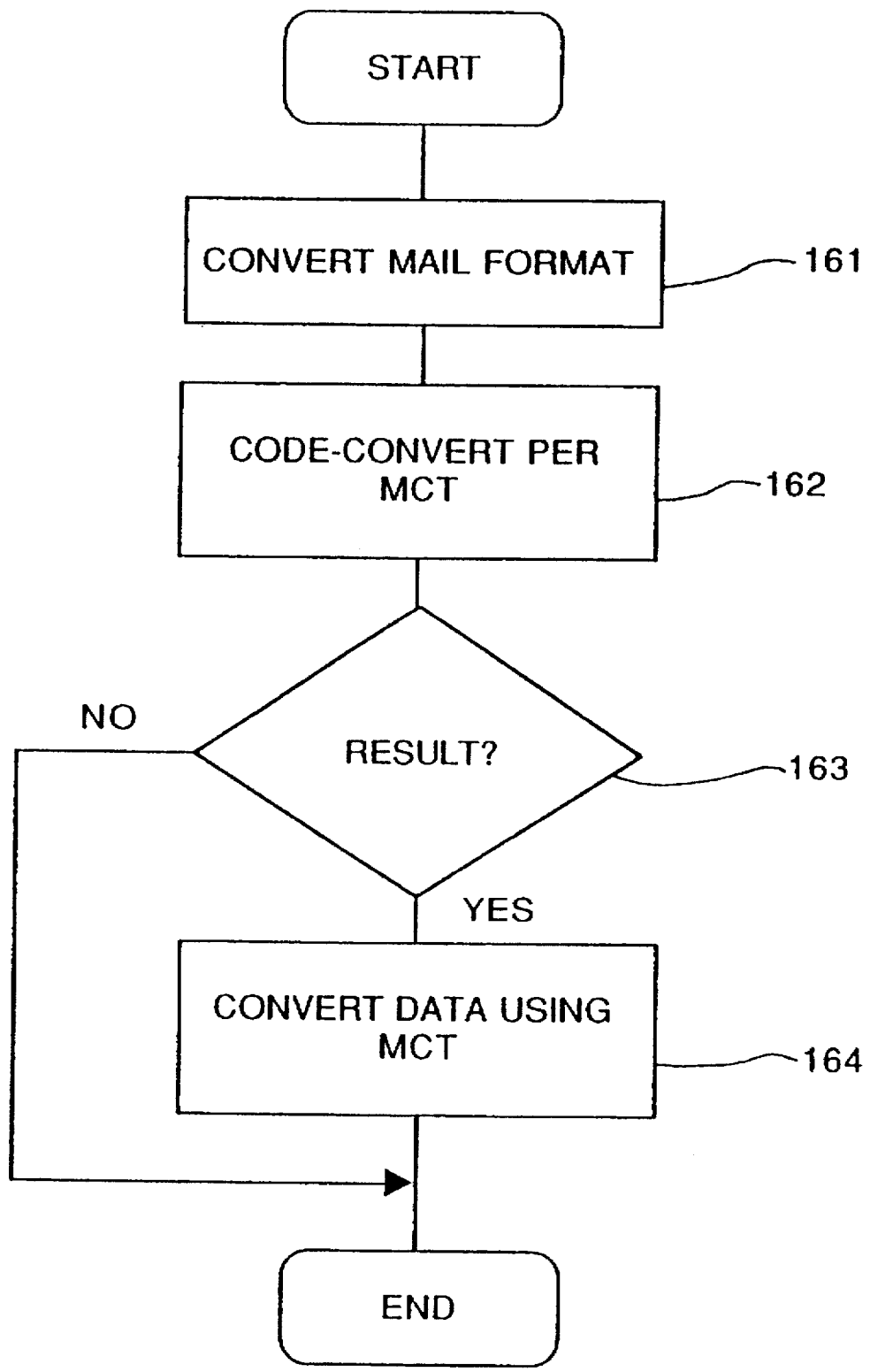
FIG. 9 is a flow chart of a mail format/code conversion routine.

Next, the procedure of steps 123 and 133 of the call of the mail format/code conversion routine 13 will be described with reference to FIGS. 8 and 9. FIG. 8 shows the mail converting table (MCT) 14 that is within the electronic mail server 2 and accessed when communicating with the job control terminal 4. Line 141 has an entry 146 to define the host; line 142 has an entry 154 to define the electronic mail server 1; and line 143 has an entry 155 to define the mail terminal. The following lines are subsequent entries for the mail terminal 1. The number of lines for the mail terminal 1 correspond to the kinds of mail terminals 1 connected with the electronic mail server 2. The entries 146, 154 and 155 designate entry names. Entry 147 designates a user code for each line, that is each system, for code conversion. Fields are provided for the letter size 148 used in each system, the letter pitch 149, the line pitch 150, the letter style 151, the number of lines per page 152 and the functional letter characterization 153 such as an underline or special letters defined in the data for controlling the format. Fields 148 through 153 are used for converting the data in the job mail. Correspondence between individual systems are shown with respect to the field entries 147 through 153, which are provided for each of the lines 141, 142, 143 and subsequent lines. In order to convert the content of data within the spool file 37 of a host computer 42 into a format for the electronic mail server 2, for example, the field entries for lines 141 and 142 are used for the conversion. The field entries for line 143 relating to the mail terminal 1 are used for conversion when a mail terminal 1 refers to mail with respect to the mail box 10.

The procedure employed by the mail format/code conversion routine 13 will be described with reference to FIG. 9, which employs the field entries obtained from the MCT table of FIG. 8. First of all, at step 161, the mail format (for example of the management information and the text) is converted from that of the electronic mail server 2 to that of the job control terminal 4. The management information includes the name of the issuer of the job mail, the date of issuing, the name of the intended receiver, and a title identifying the job mail. In step 162, the content of the job mail is code-converted between the code of the electronic mail server 2 and the code of the job control terminal 4 by using the entries of the MCT 14 of FIG. 8. The job control terminal 4 uses the field entries of line 141 for the host computer, because the host data is stored as is, and the electronic mail server 2 uses the entries in line 142.

In step 163, it is decided whether or not the converted data is that of a job execution result. If the answer obtained with step 163 is yes, processing proceeds to step 164 where the data from the spool file 37 is converted into the data format for the electronic mail server by using the field entries in the MCT 14. This conversion is carried out from the host entries of the coded line 141 of the MCT 14 and the electronic mail server entries in the fields of the line 142, for conversion of the individual characteristics set forth in respective entries 148 to 153 to provide correspondence. An example of a no result from step 163 is that of job progress mail. Thus, the procedures for the mail format/code conversion routine 13 end.

Figure 10:
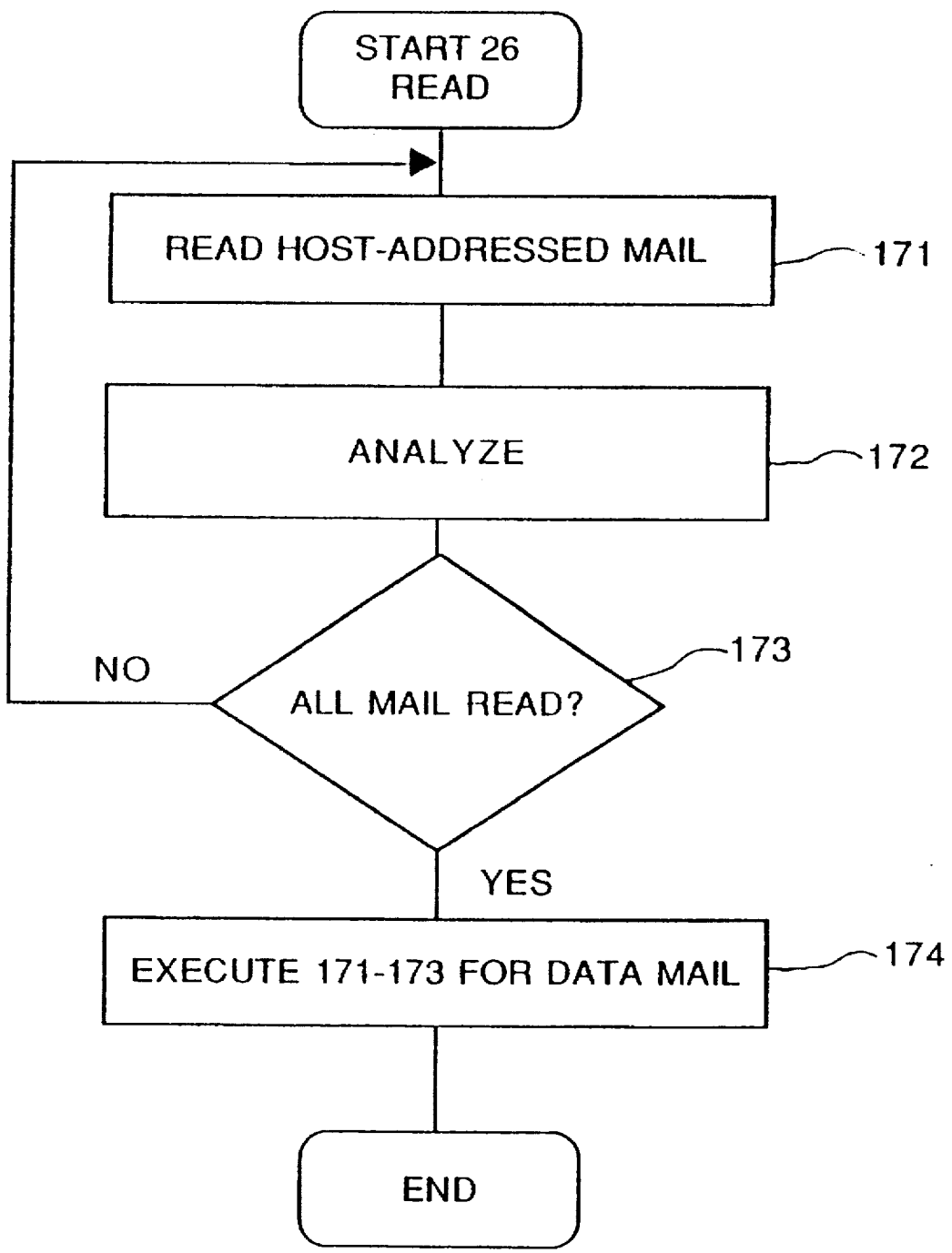
FIG. 10 is a flow chart for reading job mail from a mail box branch at a job control terminal.

Next, the procedure followed by the job mail network exchange and conversion routine 26 of the job control terminal 4 will be described with reference to FIGS. 10 and 11. FIG. 10 refers to the read, whereas FIG. 11 refers to the write.

The procedure of FIG. 10 is periodically performed with respect to the mail box 10 at constant time intervals under the control of the operating system 25 of the job control terminal 4. At step 171, the job offer paper mail 6 is read from the host addressed private box 22 of the mail box branch 20. At step 172, the content of the offer paper mail 6 is analyzed to start the job mail receipt/distribution 27. At step 173, it is decided whether or not all the mail has been read and processed. If the answer is no, the procedure returns to step 171. If the answer is yes at step 173, step 174 is performed, and the data mail 9 from the job addressed private box 23 of the mail box branch 20 is also subjected to the same procedures as were performed in steps 171 through 173. At this point, the reading procedure from the mail box branch 20 in accordance with the routine 26 ends.

Figure 11:
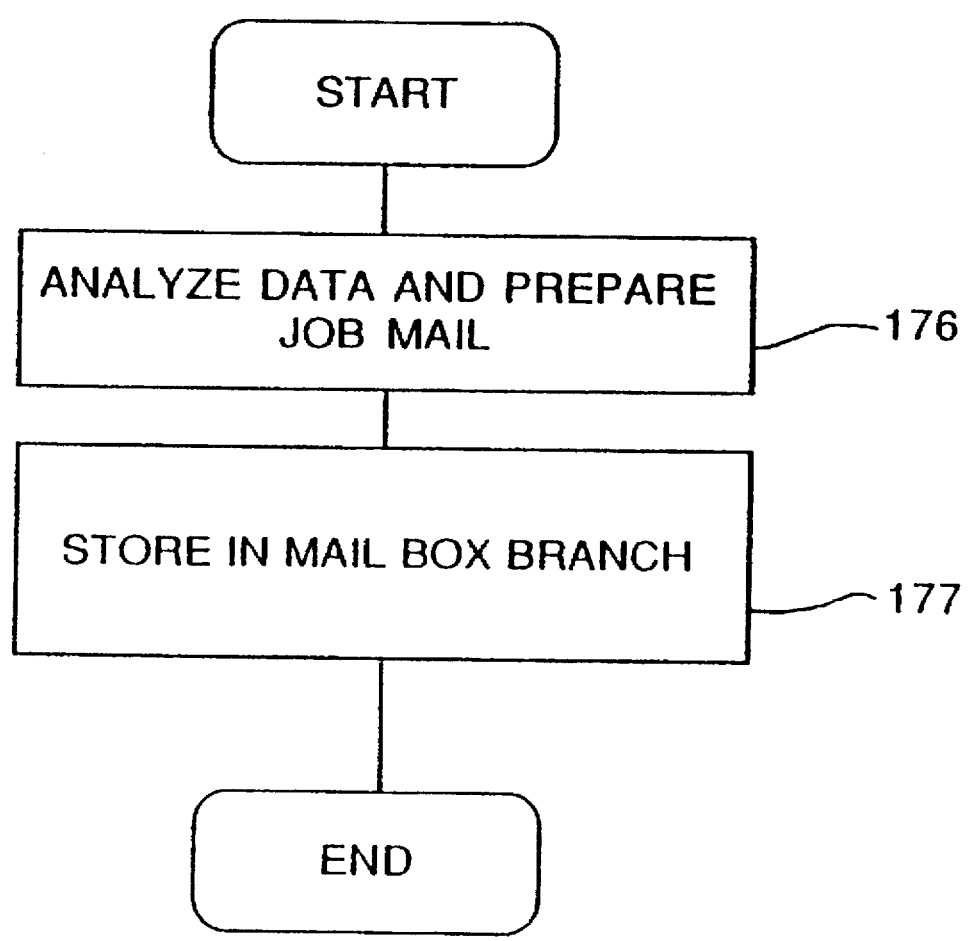
FIG. 11 is a flow chart for writing job mail in a mail box branch at a job control terminal.

FIG. 11 is a flow chart showing the execution of the job mail network exchange and conversion routine 26 for writing the job execution result mail 7 and the job execution progress mail 8 in the mail box branch 20. This routine is started by the job mail receipt/distribution routine 27. At step 176, the data delivered from the job mail receipt/distribution 27 is analyzed to prepare the job mail 5. This job mail 5 contains the job execution result mail 7 and the job execution progress mail 8. In step 177, the job mail prepared in step 176 is stored in the user-addressed private box 24 of the mail box branch 20, at which time the procedure ends.

Next, the procedures with respect to receipt and distribution of job mail will be respectively described with reference to FIGS. 12 and 13 in accordance with the flow of steps conducted by the job mail receipt/distribution routine 27.

Figure 12:
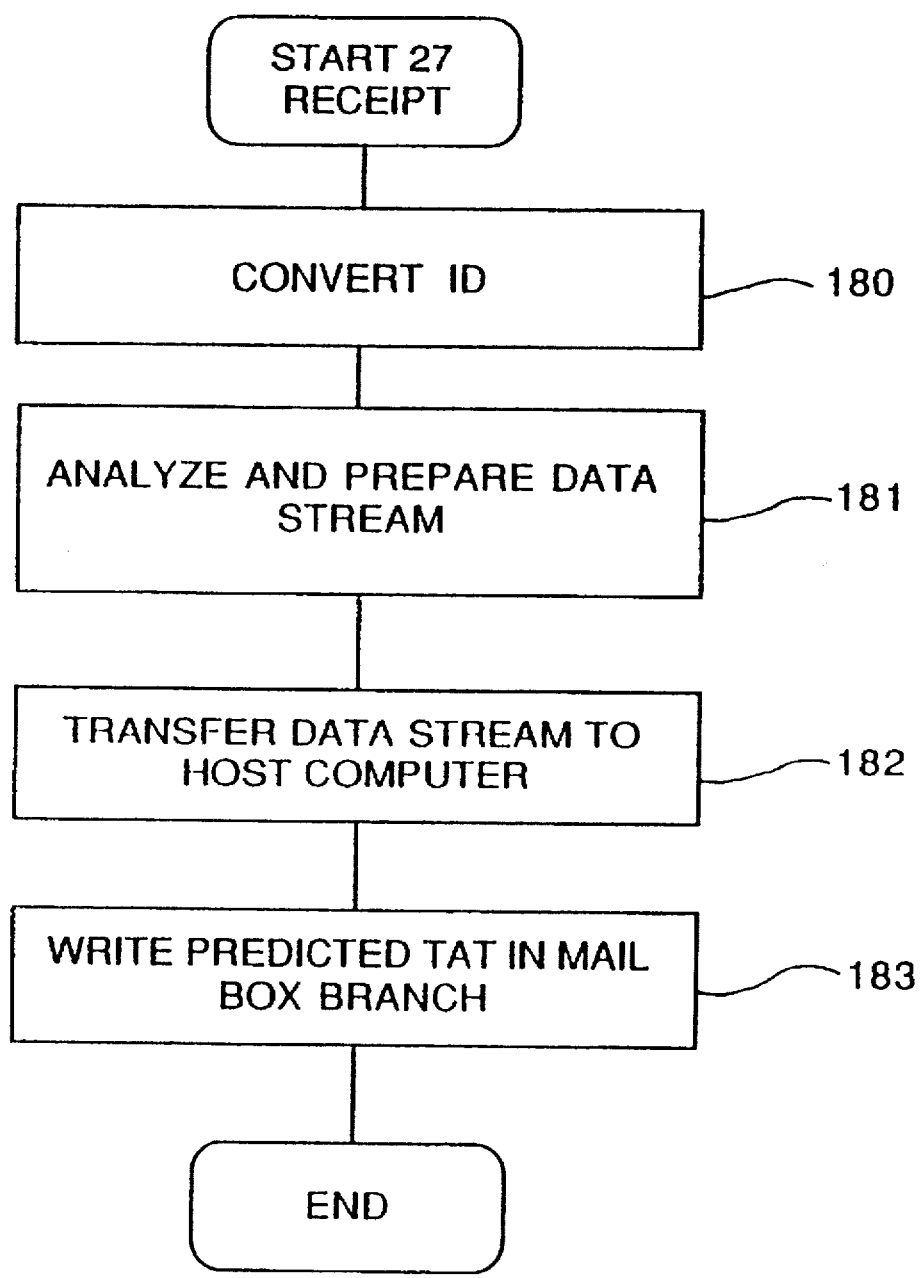
FIG. 12 is a flow chart of a job receipt at a job mail.

Mail receipt in accordance with the job mail receipt/distribution routine 27, as shown in FIG. 12, is started from the job mail network exchange and conversion routine 26 to transfer the job mail 5 read from the mail box branch 20. The job mail 5 contains offer paper mail 6 and data mail 9. At step 180, the mail/host ID conversion file 49 is used to convert the job mail ID of the requester into the corresponding host ID by employing the user ID conversion file 50. The construction of the mail/host ID conversion file 49 will be described with reference to FIG. 26. The mail/host ID conversion file 49 is constructed as a table providing correspondence between a mail ID entry 291 and a host ID entry 292. In case there is a conversion into a representative user ID, an identical host ID may not correspond to different mail IDs. In case the mail ID of the requester is not present in the entries of the mail ID entry 291 (e.g., no security clearance, or authorization), then the mail ID is recognized as a not-allowed user and a return mail is written in the user-addressed private box 24 of the mail box branch 20 so as to distribute the notice of the not-allowed user.

At step 181 of FIG. 12, the mail is analyzed to prepare a data stream for transfer to the host computer. This data stream will be described with reference to FIG. 14, subsequently. At step 182, a transfer macro is issued to transfer the data stream to the host computer 42 for execution. At the processing time of step 182, in order to select a host computer 42 for execution, communication with the host computer operation monitor control or routine 44 is performed to obtain the previously monitored running state of the host computers 42. When all the host computers 42 are not capable of execution, for example when they have been turned off, the job mail is written in the mail box 20 and the job control system enters a wait state until one of the host computers 42 is capable of execution, so that the writing is independent of the host computer running. In the event a plurality of the host computers 42 are determined to be turned on, the TAT of the job class, to which the job mail belongs, is examined for each host computer with reference to the job TAT table 29 shown more fully in FIG. 24 to select the host computer 42 having the shortest TAT as the host computer to execute the job mail. As shown in FIG. 24, the job TAT table 29 is constructed of a job class 283 and a job TAT 284 for managing the TAT of each host computer in accordance with operation of the job control terminal 4. At step 183, in order to distribute the predicted TAT for executing the job of the job mail to the issuer of the job mail, job execution progress mail 7 having the job predicted TAT is written in the user-addressed private box 24 of the mail box branch 20. The predicted job TAT is determined with reference to the job TAT 284 of the corresponding class of the host computer selected by reference to the job TAB table 29. The procedure thus far described is the job mail receiving procedure.

Figure 13:
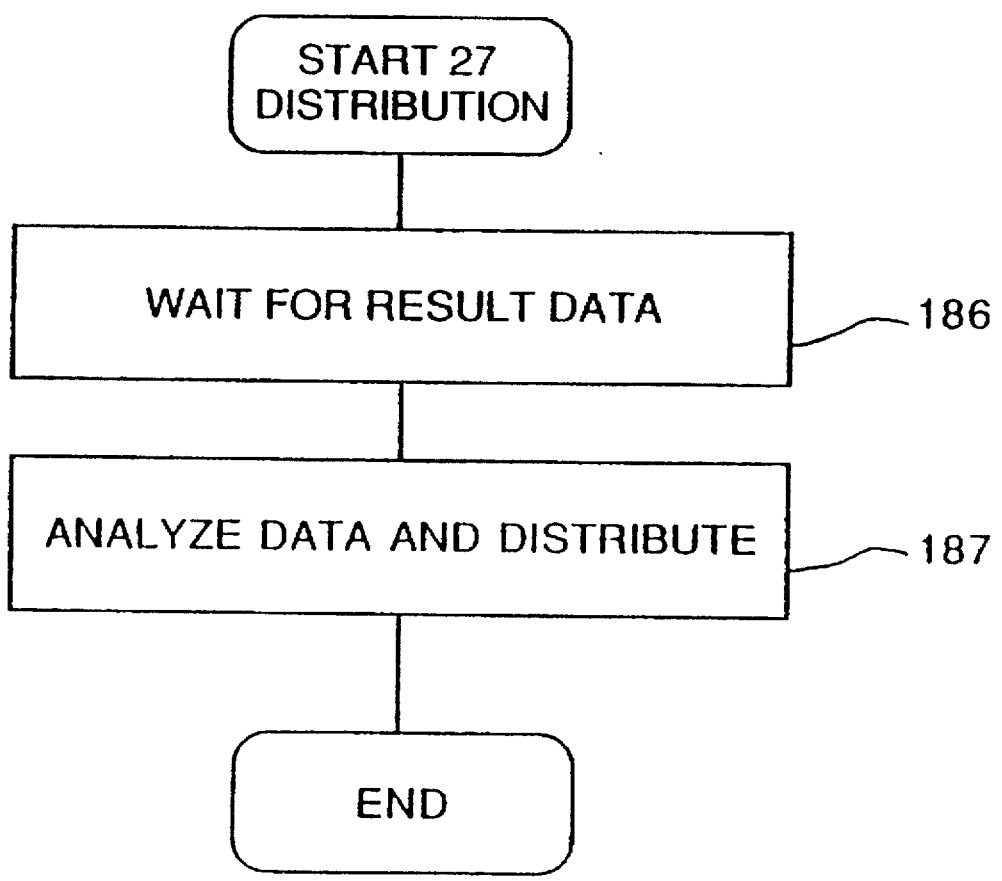
FIG. 13 is a flow chart of a job result distribution.

FIG. 13 shows the procedure for receiving and distributing the job execution result mail 7, with respect to the results of execution by the host computer 42. The job execution result mail 7 is composed of the job execution result and the job execution progress data. At step 186, the result data is obtained from the host computer 42 that is executing the job. When the result data is transferred from the host computer 42, then step 187 is executed. At step 187, the data received in step 186 is analyzed to start the job mail network exchange and conversion routine 26, thereby to transfer the analyzed data in accordance with the distribution method desired until the result data is registered as the job execution result mail 7 in the user-addressed private box 24 of the mail box branch 20.

Figure 14A:
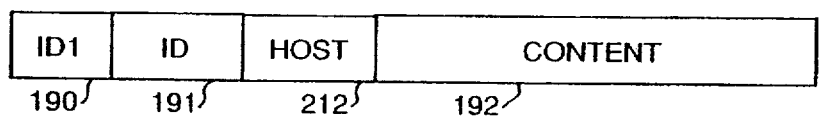
FIGS. 14(a)–14(d) show forms of data streams transferred between a job control terminal and a host computer.
Figure 14B:
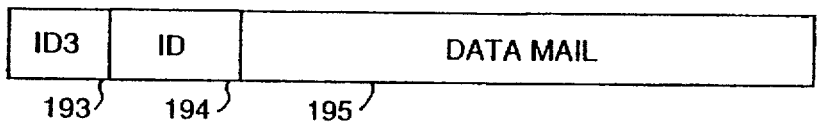
Figure 14C:
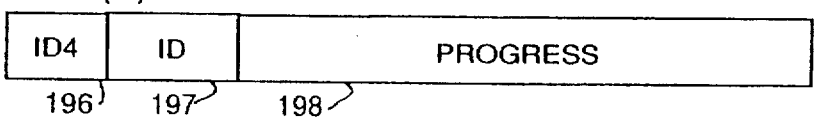
Figure 14D:
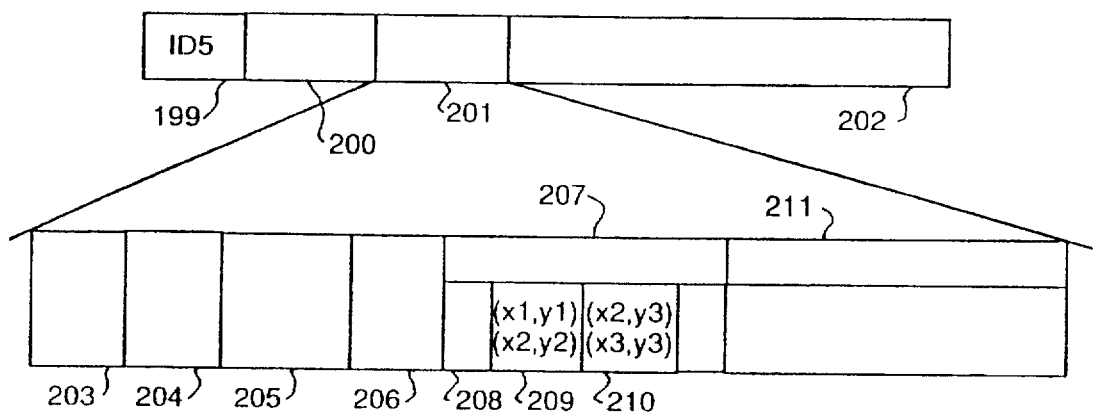

The form of the data stream transferred between the host computer 42 and the job control terminal 4 is shown, by way of example, with reference to FIGS. 14a through 14d. FIG. 14a shows the structure of the job offer paper mail 6, FIG. 14b shows the structure of the data mail 9 used to send the data for job execution to the job control terminal 4 and ultimately to the host computer 42. In FIG. 14a, a field 190 contains a discrimination ID 1 of the data stream, field 191 contains the ID result of the performance of the conversion step 180 of FIG. 12, field 212 designates a host computer selected for execution in accordance with step 180 of FIG. 12, field 192 designates the content of the offer paper mail 6. FIG. 14b shows the construction of the data stream for the data mail 9. In FIG. 14b, field 193 designates a discriminator ID 3 for the data stream, field 194 designates a job ID to which the data belongs, and field 195 designates the data mail. FIG. 14c shows the content of the job execution progress mail 8 and FIG. 14d shows the structure of the data stream forming the job execution result mail 7. The job mail 5 is sent from the host computer 42 through the job control terminal 4 to the mail box 10. In FIG. 14c, field 196 designates a discriminator ID of the data stream, field 197 designates a discriminator mail ID of the job requester, and field 198 contains data indicating the progress of the job execution. In FIG. 14d, field 199 designates a discriminator ID of the data stream and field 200 designates the distribution destination information containing the distribution destination name 65 and distribution method, one of 67 through 68 as shown in FIG. 3. The field 202 designates spool information containing the job execution result and field 201 designates the format control information. The format control information of field 201 is more specifically designated with reference to fields 203 through 211. Field 203 designates the letter size of the spool information 202, field 204 designates a letter pitch, field 205 designates a line pitch, field 206 designates a style, and fields 207 and 211 designate rule address information stored for each identical line kind. More specifically, the field 208 designates a line kind and the fields 209 and 210 designate the coordinate values of respective end points of a line. The spool information of field 202 contains a function letter in case the job execution result and the format 201 are changed. The type of the data stream to be transferred between the job control terminal 4 and the host computer 42 is thus described in accordance with the data shown in FIG. 14.

The procedures for the job mail execution control routine 33 and the spool extraction routine 35 that are executed by the host computer 42 will be described with reference to the flow charts of FIGS. 15 through 19.

Figure 15:
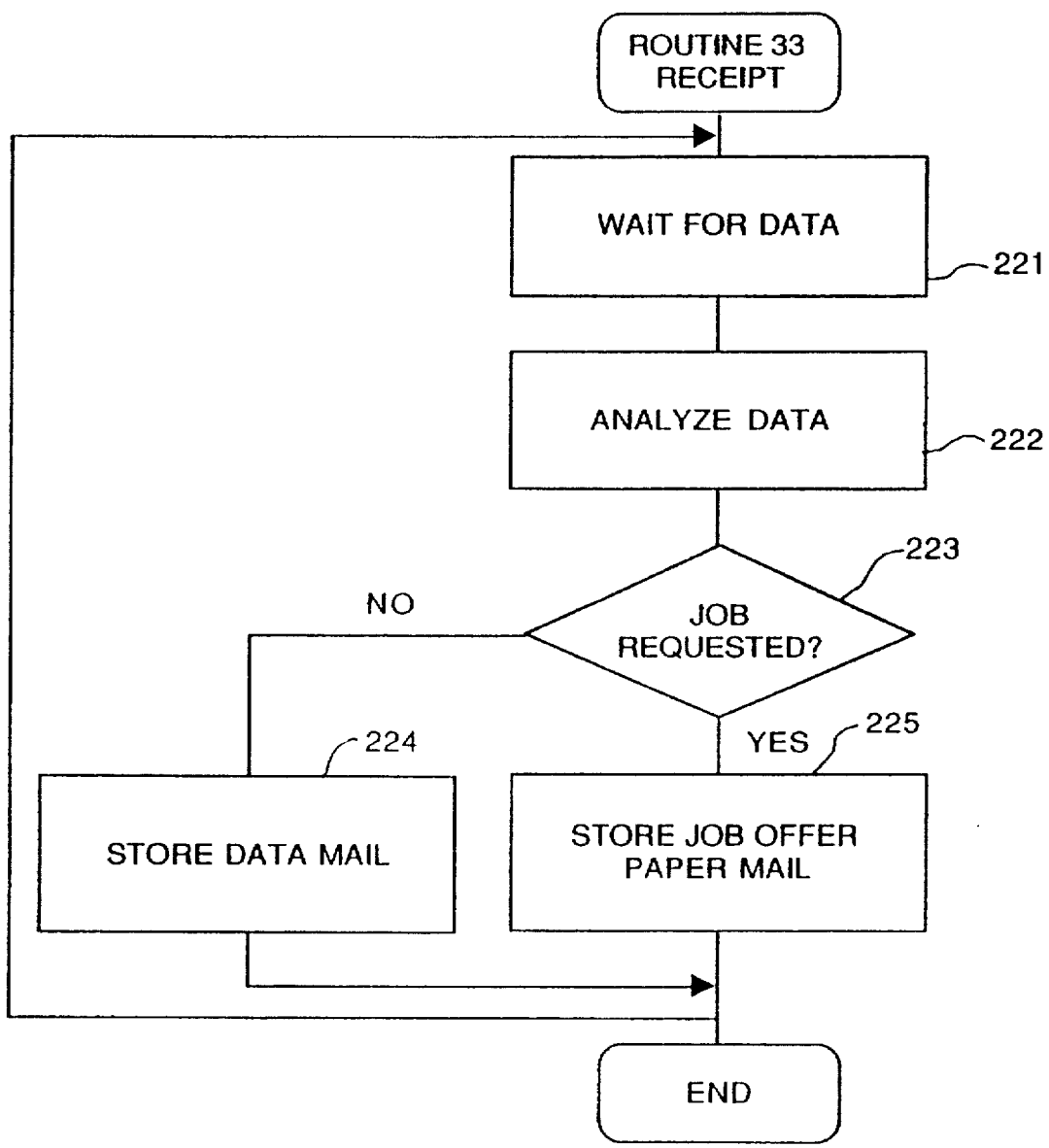
FIG. 15 is a flow chart of a job mail receipt at a job mail execution control portion.

FIG. 15 shows the receipt of job mail from the job control terminal 4 in the job mail execution control routine 33. In step 221, the host computer will await the receipt of data from the job control terminal 4. When the data is received in step 221, the data stream having the structure as described in FIG. 14 is then analyzed in accordance with step 222. At step 223, it is decided whether or not a job is requested to be executed, and if the answer is yes processing proceeds to step 225, and if no processing proceeds to step 224. If the answer to step 223 is no, then step 224 considers that the data stream is from data mail, and the data stream is stored as the input data for the corresponding job described by the job JCL file 38. If the answer to step 223 is yes, step 225 considers that the data stream is with respect to offer paper mail 6 and the job requesting information contained therein is received from the job control terminal 4 and registered in the job offer paper file 36. Then, the receipt of the job mail conducted in accordance with the job mail execution control routine 33 is ended.

Figure 16:
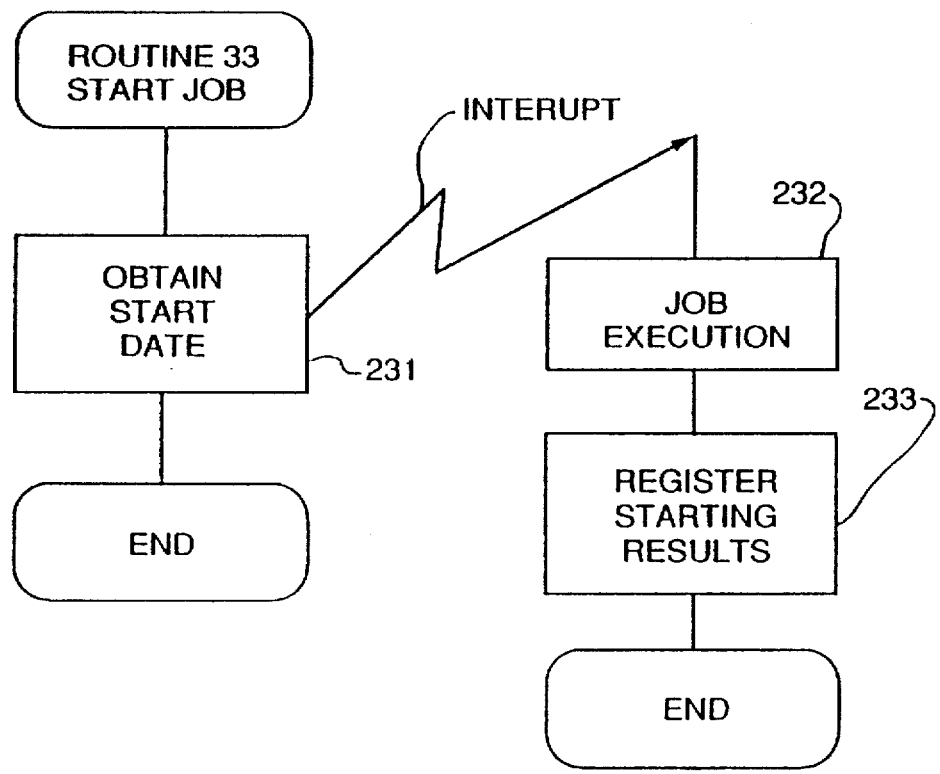
FIG. 16 is a flow chart of a job start at a job mail execution control portion.

FIG. 16 shows the job starting portion of job mail execution control routine 33. At step 231, the job offer paper file 36 is referred to with respect to the start date of each job to be executed by the OS 31, to thereby interrupt the operating system timer at the start date, for starting execution of the job at that start date. Steps 232 and 233 are steps for performing the interruption. At step 232, the JCL of the corresponding job having arrived at the start date is extracted from the job JCL file 38. The JCL description thus extracted is converted into an executable form as the host computer ID job of the job requester and is introduced into the OS 31 as instructions for execution. When the JCL description is in the offer paper mail 6, the job JCL file 38 is not read, but rather the JCL description is examined to discriminate whether the thus described job is for the host user ID of the job requester. If yes, the job JCL description is introduced into the OS 31, otherwise, an error message is output as the execution result to the spool file 37. The jobs introduced into the OS 31 are consecutively stored together with ordinary batch jobs in the input queue 47 of the spool file 37. As step 233, the content of the job thus started is registered in the job mail table JMT 32. The steps thus far described belong to the job starting procedure of the job mail execution control routine 33.

Figure 17:
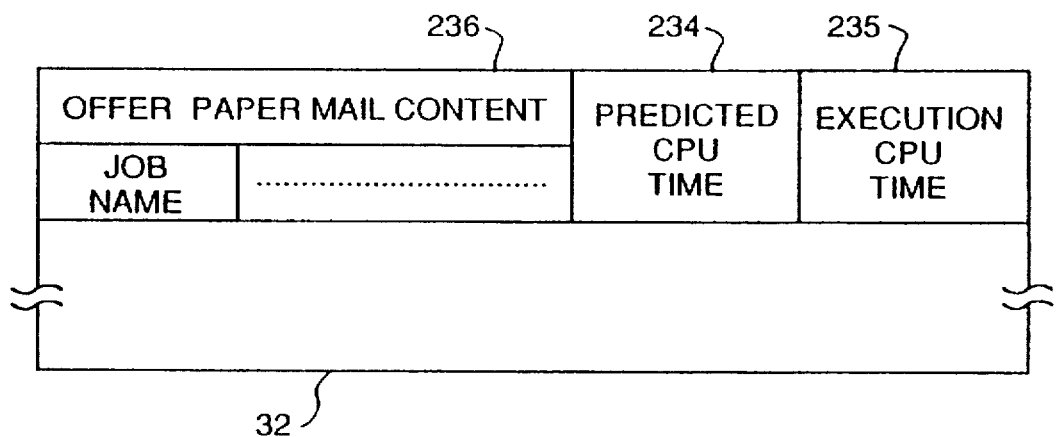
FIG. 17 is a diagram showing construction of a JMT (Job Mail Table)

With reference to FIG. 17, the content of the JMT 32 for managing the job which has been requested by the offer paper mail 6 is shown. In FIG. 17, the field 236 refers to the content of the offer paper mail 6 at the time it is stored. Field 234 contains the predicted CPU time for executing the job and field 235 contains the execution CPU time of previously executed jobs of the same class. The job execution progress is calculated by dividing the CPU execution time of field 235 by the predicted CPU execution of time contained in field 234.

Figure 18:
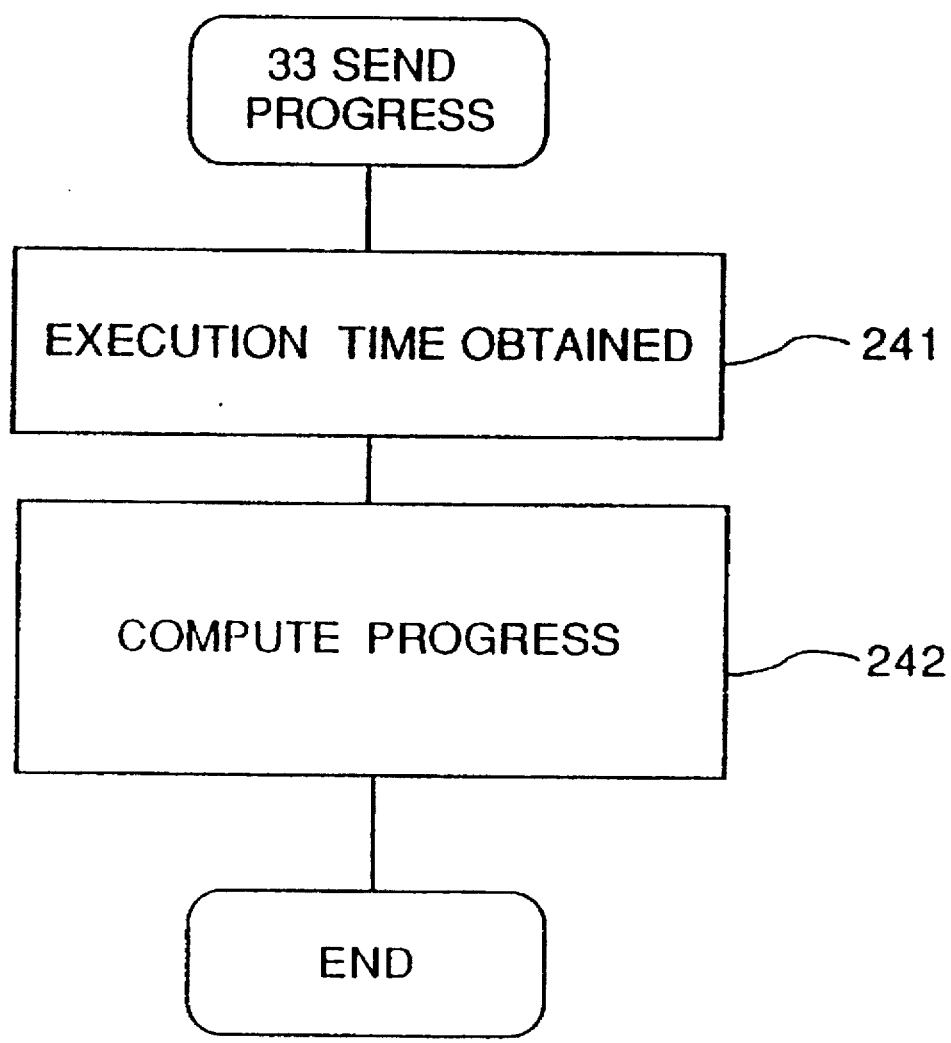
FIG. 18 is a flow chart of a job execution sending at a job mail execution control portion.

FIG. 18 is a flow chart showing the sending portion of the job mail execution control routine 33 with respect to sending progress data concerning the progress of executing the job. The routine of the flow chart set forth in FIG. 18 is conducted periodically at constant time intervals by the OS 31. At step 241, the execution CPU time from field 235 with respect to jobs previously executed is collected from the OS 31 and is stored in the JMT 32. At step 242, the above-mentioned job progress is computed from the data within the JMT 32 with respect to the content of the field 234 having the job predicted CPU time and the field 235 having the job execution CPU time to prepare the data stream of FIG. 14c for the same class as the job class. This data stream indicating progress is transferred to the job control terminal 4. This method of computing the job progress is only one example and the computation of the job progress may be in accordance with ESR, which is disclosed in "One Method of Performing Management in Computer Systems and Experiments Using the Method", Report of Information Processing Associate, Vol. 23, No. 6, pages 591–598, and in U.S. Pat. No. 4,495,562, the disclosures of which are incorporated herein in their entirety.

Figure 19:
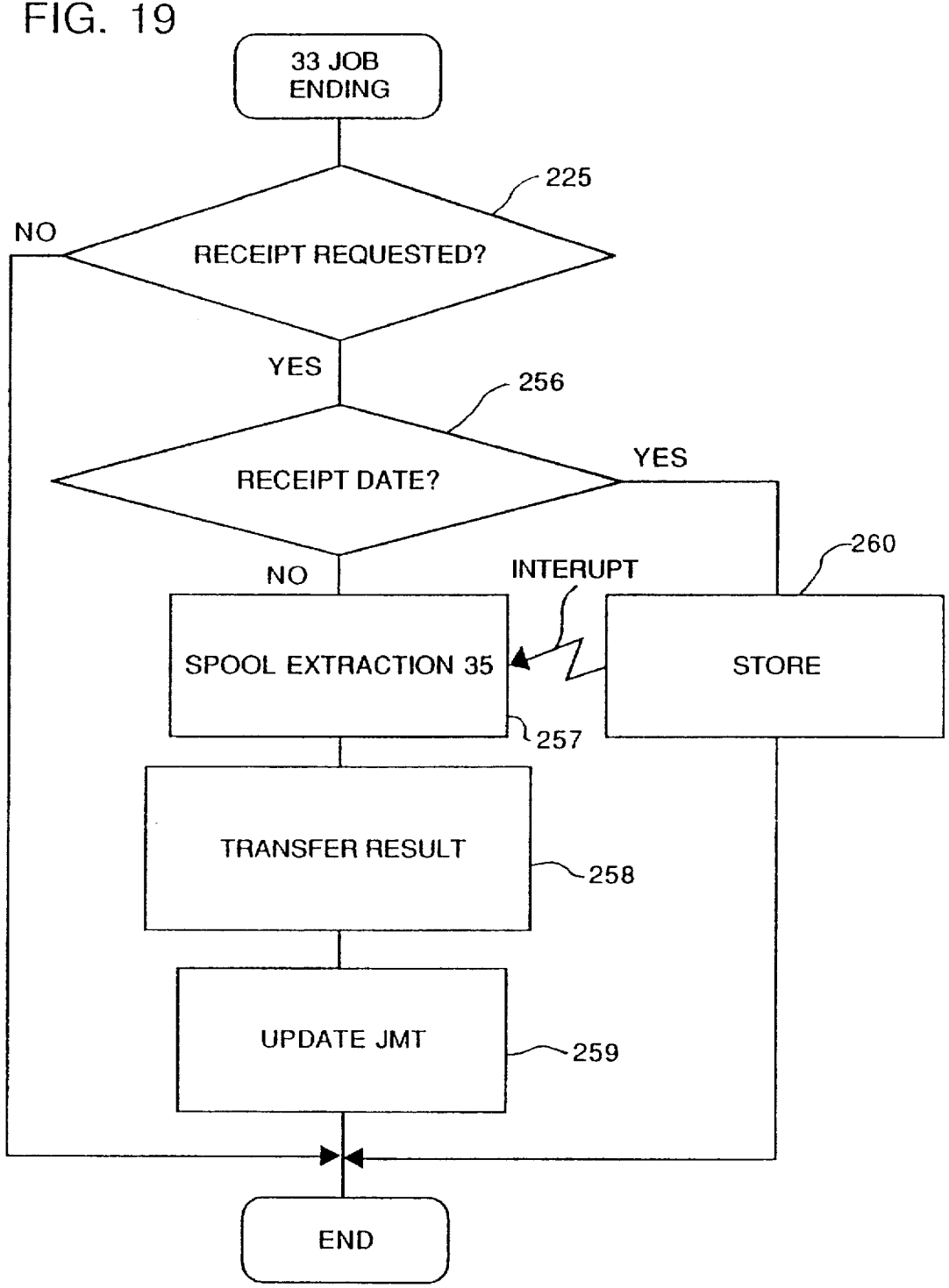
FIG. 19 is a flow chart of a job ending at a job mail execution control portion.

Next, a job ending portion of the job mail execution control routine 33 will be described with reference to the flow chart of FIG. 19. By performing this routine, the job execution result mail 7 will be provided with the job execution result information so that such information will be transferred only by the indicated distribution method. The job ending routine of FIG. 19 is started at the end of job execution by the OS 31. At step 255, it is decided whether or not the job ending portion of the job mail execution control routine 33 is to receive the execution result, and if no, the routine portion of FIG. 19 ends. When there is coincidence between the job name field of the JMT 32 and the job requested by the job offer paper mail 6, the job execution results are recognized as those requested by the job mail. In such a case, the request for receiving the execution result is demanded and the following steps are executed. In the case of an ordinary batch job or a job wherein execution results are not requested, the answer to step 255 is no and the routine portion is ended. In the event that the answer to step 255 is yes, at step 256, it is decided whether or not the receipt date of the execution result has been appointed at the job request time. At this timer interruption, the control is transferred to step 257. If yes, at step 260, the job execution result data is registered in the OS 31 and the timer interruption is executed at the receipt date. At this timer interruption, the control is transferred to step 257. At step 257, the execution result of executing the job by the host computer 42 is extracted to start the spool extraction routine 35. At step 258, the data stream of the job execution result as shown in FIG. 14d is prepared from the information extracted by the spool extraction routine 35 in step 257 and this data stream is transferred to the job control terminal 4. At step 259, the job is deleted from the JMT 32 by updating the JMT. Thereby, the job ending portion of the job mail execution control routine 33 ends.

Figure 20:
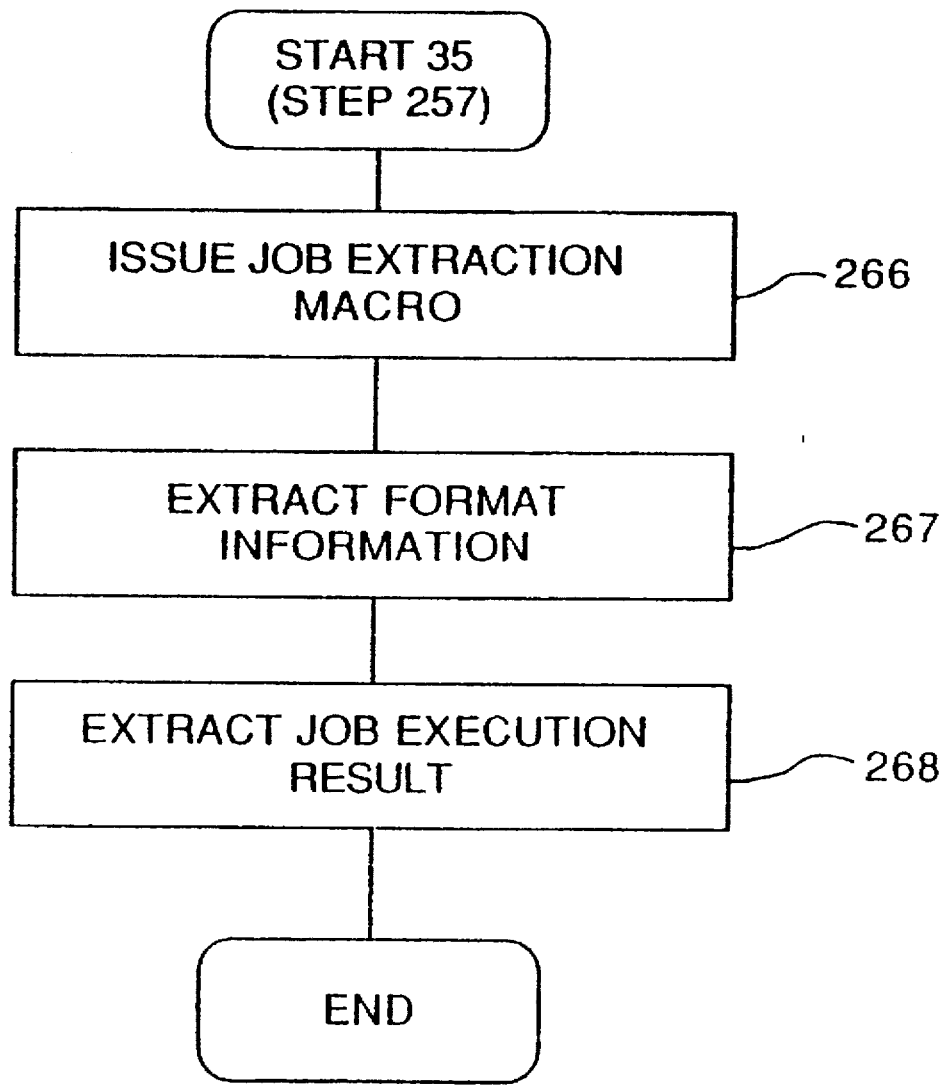
FIG. 20 is a flow chart of a spool file extraction at a job mail execution control portion.

Next, the procedures for the spool extraction routine 35 of step 257 will be described in more detail with reference to the flow chart of FIG. 20. At step 266, an OS macro, referred to before, is issued to read the execution result data from the spool file 37. The OS 31 extracts the execution result data from the output queue 48. When an output job class is designated, the OS macro is issued so as to extract the job execution results corresponding to the designated output job class. When the output job class is not designated, all the job execution results are extracted. At step 267, the format information (for example, the letter size, the letter pitch or the rule address) of the job execution result is extracted from the spool file 37. At step 268, the substance of the job extraction result is extracted from the spool file 37. The foregoing steps 266–268 define the spool extraction routine 35.

Next, the JTATH, 87, manages the job TAT table 29 corresponding to the job class concerning the execution on the host computer 42. The job TAT is the time period between the time that the job was introduced into the computer system 3 to the time when the job execution ends, and is recorded in portion 284 of FIG. 24, with respect to set TAT 1, TAT 2 . . . TATn. The TAT for each job class 283 is updated by averaging the entries for the TAT 284 for that job class. Thus, the content of the JTATH 87 is periodically reflected on the JTATW 29 of the job control terminal 4. The JTATH is a TAT table having a structure as shown in FIG. 23 wherein there are entries containing the job class 281 and the job TAT 282.

A mail exchange between the electronic mail server 2 and the job control terminal 4, in accordance with the preferred embodiment may take on the following two forms:

(a) With respect to the thus far described embodiment, the job mail network exchange and conversion routine 26 of the job control terminal 4 writes the job mail in the mail box 10 of the electronic mail server 2 and reads the job mail from the mail box branch 20 of the job control terminal 4. Accordingly, the conversion of the mail format is executed in the job control terminal 4. An advantage is that the electronic mail server 2 does not need to be aware of the job control terminal 4, specifically does not need to know the format used by the job control terminal 4.

(b) In a modification, the job mail network conversion routine 16 and the job mail network exchange and conversion routine 26 of the electronic mail server 2 and the job control terminal 4 can make a standard use of a mail distribution program (for example a program known as SENDMAIL) of the UNIX system. Accordingly, neither the electronic mail server 2 nor the job control terminal 4 needs to have any direct contact with the other's mail boxes.

Furthermore, the job offer paper file 36, the spool file 37 and the job JCL file 38 can be provided commonly for the individual host computers or may be provided independently for the individual host computers 42. Accordingly, the host computers may be geometrically scattered and present as single systems when the disk files 36–38 are independently provided. Also, in such a case, the construction of the job control terminal remains unchanged. However, the line 29 connecting each host computer 42 and the job control terminal 4 makes a circuit for such connections. According to such a construction, the electronic mail server 2 and the job control terminal 4 will operate as previously described.

Figure 21:
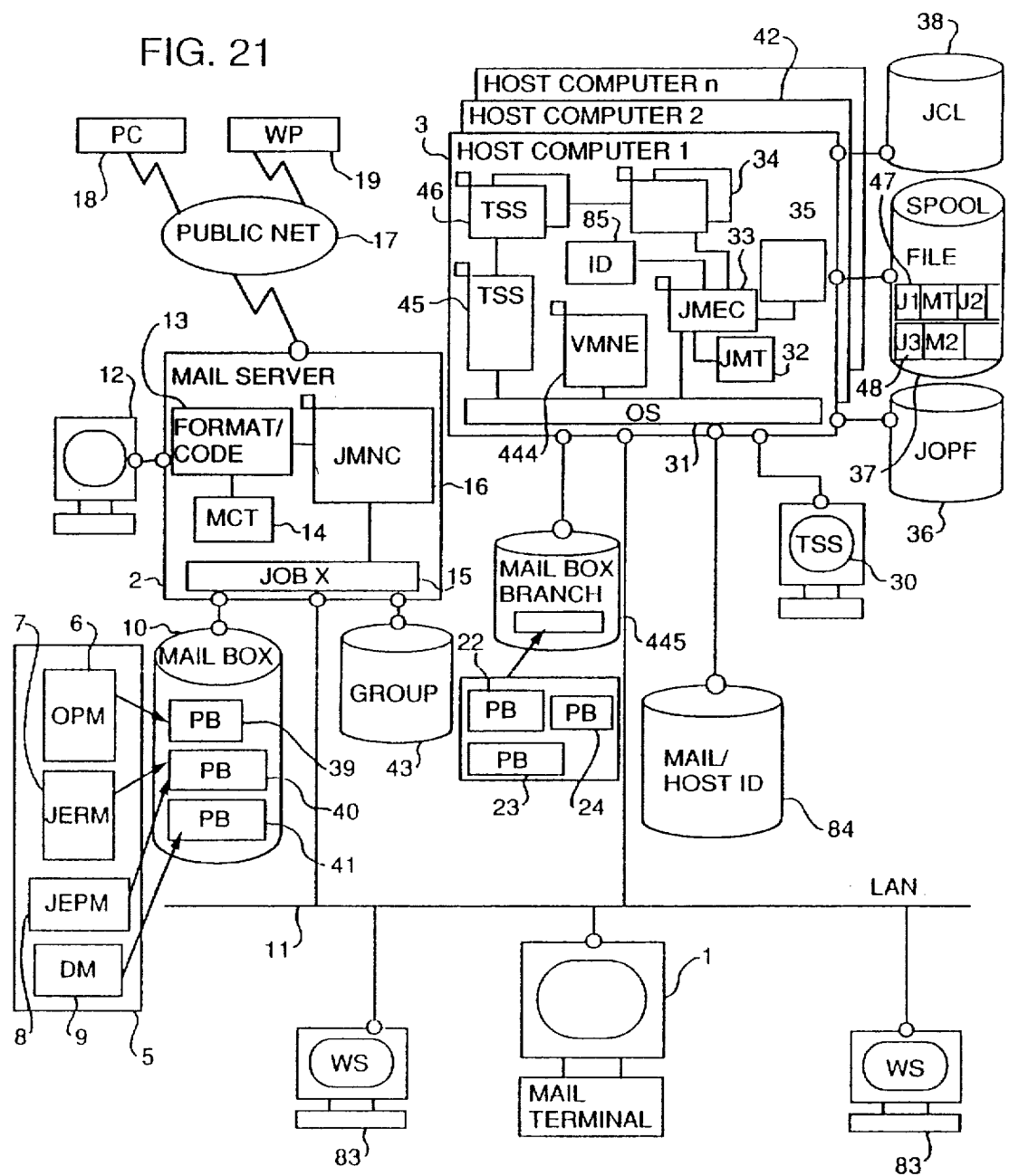
FIG. 21 is a diagram showing another electronic mail driven type job execution control of the present invention.

The foregoing embodiment of FIGS. 1–20 is directed to a system constructed of the electronic mail server 2, the job control terminal 4 and the computer system 3. Next an embodiment having no job control terminal 4 will be described with reference to FIGS. 21 and 22. This new embodiment provides a method of realizing the running mode, in which a jog control terminal for managing the computer system 3 generally is absent. In FIGS. 21 and 22, like numerals refer to like parts. The following description will stress the differences between the construction of the embodiment of FIGS. 22 and 21 relative to the construction of the embodiment of FIGS. 1–20. The series of job execution control functions requested from the mail terminal 1 are identical to those of the first embodiment. The job mail network conversion routine 16 of the electronic mail server 2 executes the read and write for the mail box branch 20 of the job control terminal 4 in the embodiment of FIG. 1, but the mail box branch 445 connected with the host computer 42 in the embodiment of FIG. 21 is controlled for read and write directed by the respective host computer 42. This latter construction provides advantages that the job mail network conversion and exchange routine 16 of the electronic mail server 2 may execute both the read and write so that: the computer system 3 need not be aware of the mail format intrinsic to the electronic mail server 2, and the computer system 3 has no host routine referring to the mail box 10 of the electronic mail server 2 on the network for reducing the overhead with respect to the LAN 11. This latter method is especially effective in the case the mail box 10 has no job execution requesting mail. The offer paper mail 6 providing the job request issued by the mail terminal 1 and the data mail 9 to be sent to the host computer 42 for execution of the job are stored by the job mail network exchange and conversion routine 16 of the electronic mail server 2 in the mail box branch 445 connected with the corresponding host computer 42. After this, the job mail network exchange routine 444 in the host computer 42 refers to the mail box branch 445 periodically to store the job requesting offer paper mail 6 in the job offer paper file 36 along with the data mail 9, which is to be sent to the host computer 42 when executing the job as the input data of the corresponding job in the job JCL file 38. The job mail execution control routine 33 extracts the job requesting offer paper mail 6 from the job offer paper file 36 and calls the user ID conversion routine 85. This user ID conversion routine 85 uses the mail/host ID conversion file 85 (similar to the file 49 of the first embodiment) to execute the test of the mail ID of the mail issuer and convert it to the corresponding host computer ID. This host computer ID is utilized as previously described with respect to the embodiment of FIGS. 1–20. Next, the job corresponding to the job requested in the offer paper mail 6 is extracted from the job JCL file 38 in order to determine whether or not the job has a designated start date and whether or not the job execution results are to be distributed at the end of execution. If receipt of execution results is requested by the use of job execution result mail 7, the job execution result is extracted to prepare the job progress data periodically to distribute the job execution progress mail 8. The job execution result mail 7 and the job execution process mail 8 are stored in the mail box branch 445 by the job mail network exchange routine 43. The job mail network exchange routine 16 of the electronic mail server 2 provide storage in the mail box 10 on the basis of the appointed distribution method with periodic reference to the mail box branch 445. By the series of steps thus far described, the mail terminal 1 is able to refer to the job execution result or the like and to distribute the same. The remaining components of the embodiment at least partially shown in FIG. 21 are identical to those of FIG. 1, that is the differences are with respect to the host computer 42 and job control system, and therefore like descriptions will be omitted.

In the embodiment of FIGS. 1–20, whether or not the host computer is turned off or is in a troubled state constricted with too great a load is determined by the job control terminal 1. In the embodiment of FIGS. 21 and 22, on the contrary, this decision is made depending upon whether or not the job network exchange routine in the electronic mail server can periodically communicate in a normal state with the host computer 42, in both cases it is done by the job control system. If there is a host computer incapable of transmitting, the electronic mail server 2 communicates with another running host computer to transfer the job mail. If all the host computers are incapable of transmitting, the job mail is stored in the mail box 10 during a wait state of the job control system and the electronic mail server 2 waits until there is a normal running of the host computers 42.

The embodiment of FIGS. 21 and 22 may be modified as follows.

First, the job mail network exchange routine 44 of the host computer 42 writes the mail in the mail box 10 of the electronic mail server 2 and reads the mail from the mail box branch 445. Conversion of the mail format is executed in the host computer 42 with the advantage that the electronic mail server 2 need not be especially aware of the host computer 42. As a modification, the job network exchange routines 16 and 44 of the electronic mail server 2 and the host computer 42 can use a standard mail distribution program, for example SENDMAIL of the UNIX system.

Accordingly, neither the electronic mail server 2 nor the host computer 42 needs to make direct contact with the other's mail box so that this method is effect in case the host computer 42 belongs to the UNIX system.

The disk files 36–38 and 84 can be commonly connected with the host computers or independently provided for each of the host computers 42. According to the latter construction, the individual host computers 42 can be geometrically scattered and operate as a single computer system 3 in a common transmission system with the electronic mail server 2.

As a further embodiment, the job execution request may be executed from the TSS terminal 30, which can receive the job mail. This modification can be conducted with respect to both the system of FIG. 1 and the system of FIG. 21. FIG. 22 shows a SUBMIT command 271 for introducing the job from the TSS terminal 30 (FIG. 1 or FIG. 21). This SUBMIT command is provided with a job name 272 and a MAIL operand 273 for designating the distribution method of the job execution result. The MAIL operand designates a distribution destination ID 274 and a distribution method 275. The MAIL operand is processed by the job mail execution control routine 33, and the distribution destination and the distribution method are designated by the offer paper mail. By the MAIL operand, the offer paper mail 6, which are constructed of the job name 272, the distribution destination ID 274 and the distribution method 275 of FIG. 25 are stored in the job offer paper file 36. The SUBMIT command is executed as the TSS or task command 46 under the TSS control 45 of FIG. 21 or FIG. 1 to execute the SUBMIT procedure of the job designated at 272. At the end of the job execution, the job execution result is stored as job execution result mail 7 in the mail box 10 of the electronic mail server 2 by the job mail execution control routine 33 in accordance with the distribution destination and the distribution method designated by the SUBMIT command. Similar effects could be attained even if the distribution destination ID and the distribution method were designated by the job JCL in place of the SUBMIT command.

According to the present invention, the job execution control functions on the computer system are enabled by the mail terminal to request the job execution, to send the data to be used in executing the job, to monitor the progress of executing the job, and to distribute the job execution result. The useful area of the computer system is widened by such procedures at the mail terminal, and the working and the distribution can be performed by receiving the execution result at the mail terminal.

Since the electronic mail system and the computer system are independent of each other and equipped with information exchange and conversion between them, the job execution and the reference to the execution result can be achieved anywhere by connecting the mail terminal and the computer system through the telephone lines without any necessity for defining the mail terminal on the computer system in advance. Moreover: (a) The receipt of the job offer can be executed anytime without depending upon the running time of the computer system because the job control terminal operates independently of the computer system; (b) Another running computer can be selected for execution when the host computer concerned is troubled or constricted due to load because the operations of the computer system are externally managed as a whole; (c) The execution host computer can be selected according to the load upon the host computers by managing the job TAT of each running host computer with respect to the same job class, so that the TAT of the job offered by the mail is shortened; and (d) The execution result of the job requested from the TSS terminal can be received by electronic mail.

With respect to FIG. 26, the identification conversion provided by the table can be such that the job control will reject some of the host computers 42, that is not select them, when there is no ID conversion indicating that such host computers 42 cannot execute based upon lack of authority or security. Therefore, a requester for job execution only needs to know the local mail terminal ID and does not have to know anything about the computer host, that is does not have to know which host computers do not have security clearance for the job to be executed or are not authorized for the particular user. That is, the construction of the computer system 3 is transparent to and vender independent of the mail system and the job requester.

If a previously selected host computer has trouble in executing the job, due e.g. to OS error or hardware failure, with progress monitoring such trouble can be determined by procedures similar to those of the parent application whose disclosure is incorporated herein, and another host computer is selected to execute the job as a way of automatically correcting the trouble.

Figure 27:
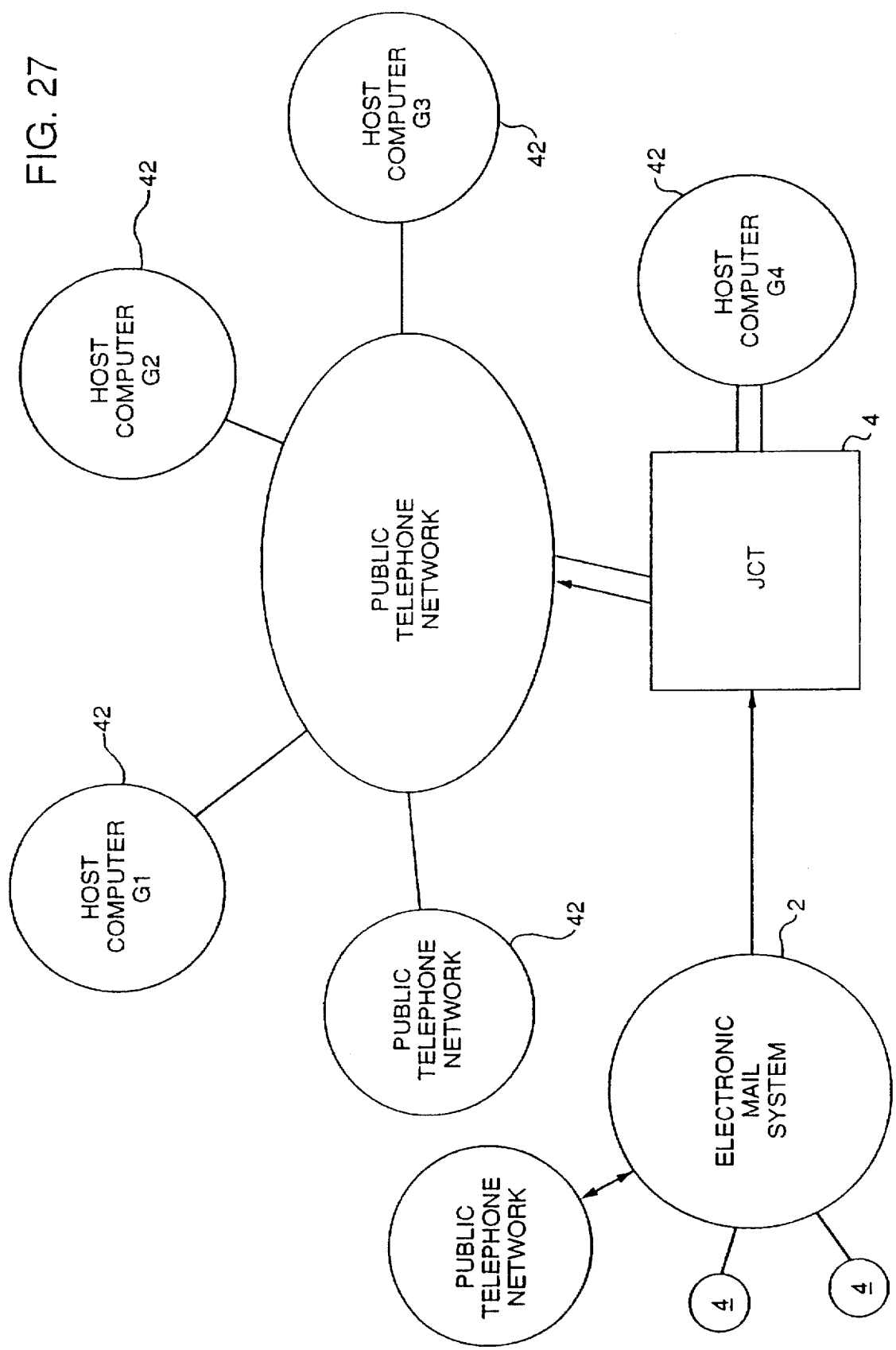
FIG. 27 shows another networking of the elements.

FIG. 27 shows another network arrangement of the various components employing a plurality of host computers 42 networked together over a public telephone network or public telephone exchange as the computer system 3 and further connected to the job control terminal 4 by separate lines as in the case of host computer G4 or by the public telephone network exchange as in the case of host computers G1, G2, G3. The electronic mail system 2 can be connected to the job control terminal 4 and connected to other job control terminals 4 or other networks as shown.

While a preferred embodiment has been set forth with specific details, further embodiments, modifications and variations are contemplated according to the broader aspects of the present invention, all as determined by the spirit and scope of the following claims.

We claim:

1. A job executing apparatus, comprising:

a job control system;

a computer system composed of a plurality of host computers;

a user system for issuing electronic mail requesting job execution;

an electronic mail system for transferring the electronic mail;

a transmission system for electronic mail interconnecting the user system, the computer system and, the electronic mail system, and the job control system; and the transmission system sending job offer type of electronic mail from the user system through the electronic mail system to the job control system independently of running of the host computers within the computer system.

2. The apparatus of claim 1, wherein said job control system monitors a running state of the host computers within the computer system to produce running state data with respect to each host computer within the computer system;

wherein said job control system selects one of the host computers within the computer system as a selected computer with selection being based upon an analysis of the running state data of at least some of the host computers; and wherein said job control system issues a job execution command to the selected computer based upon content of the job offer type of electronic mail.

3. The apparatus of claim 1, wherein said job control system monitors load of the host computers within the computer system to produce load data with respect to each host computer within the computer system;

wherein said job control system selects one of the host computers within the computer system as a selected computer with selection being based upon an analysis of the load data of at least some of the host computers; and wherein said job control system issues a job execution command to the selected computer based upon content of the job offer type of electronic mail.

4. The apparatus of claim 1, wherein said job control system commands the computer system to send job execution results based upon execution of the job of the job offer type of electronic mail, generates job execution result electronic mail from the job execution results, and issues the job execution result electronic mail to pass through the electronic mail system to the user system based upon information in the job offer type of electronic mail.

5. The apparatus of claim 1, wherein said job control system commands the computer system to send, to the job execution system, job execution progress type of electronic mail based upon execution of the job of the job offer type of electronic mail, generates job execution progress electronic mail from the job execution progress, and issues the job execution progress type of electronic mail to pass through the electronic mail system to the user system based upon information in the job offer type of electronic mail.

6. The apparatus of claim 1, wherein said job control system includes software and a dedicated computer separate from the host computers.

7. The apparatus of claim 1, wherein said job control system includes software and one of the host computers of the computer system.

8. The apparatus of claim 1, wherein the computer system has file storage and wherein said job control system has storage independent of the computer system for storing execution results from execution of the job in the computer system, and for storing both generated electronic mail and received electronic mail.

9. The apparatus of claim 1, wherein said job control system includes means for converting an electronic mail system ID into a computer system ID independently of the electronic mail system.

10. The apparatus of claim 1, wherein said job control system includes means for analyzing and converting a format of the electronic mail received from the electronic mail system to generate commands to the computer system, and for analyzing and converting the format of data from the computer system to generate electronic mail for the electronic mail system, so that the computer system is vender independent with respect to the electronic mail and user systems and so that the internal structure of and format of data within the computer system is transparent to the electronic mail system and user system.

11. The apparatus of claim 1, wherein said job control system selects one of the host computers for executing a job within a received job offer type of electronic mail based upon a comparison of information in the job offer type of electronic mail and authorization to the host computers.

12. The apparatus of claim 1, wherein said job control system selects one of the host computers for executing a job within a received job offer type of electronic mail based upon a comparison of information in the job offer type of electronic mail and security levels of the host computers.

13. The apparatus of claim 1, wherein said job control system, at fixed periodic intervals, monitors turnaround time of job execution on each of the host computers within the computer system, selects one of the host computers for executing the job of the job offer type of electronic mail based upon the turnaround times of the host computers, and issues electronic mail to the user system through the electronic mail system to provide a predicted turnaround time for job execution by the selected host computer.

14. The apparatus of claim 1, wherein said job control system, at fixed periodic intervals, monitors a turnaround time of job execution on each of the host computers within the computer system, and selects one of the host computers for execution of the job within the job offer type of electronic mail with the selection being based upon a comparison of turnaround time of at least some of the host computers.

15. The apparatus of claim 1, wherein said job control system extracts an execution date from the job offer type of electronic mail, interrupts execution within a host computer based upon the execution date and issues an execution command for execution of the job to the interrupted host computer.

16. The apparatus of claim 1, wherein said job control system analyzes the job offer type of electronic mail and determines whether or not job execution result type of electronic mail is to be issued to the mail system.

17. The apparatus of claim 1, wherein said job control system analyzes the job offer type of electronic mail and determines whether or not job execution progress type of electronic mail is to be issued to the electronic mail system.

18. The apparatus of claim 1, wherein said job control system, based upon data received from the computer system, generates and issues job electronic mail through the electronic mail system to the user system by one of single, simultaneous and circular distribution selected in accordance with information within job offer type of electronic mail.

19. The apparatus of claim 1, wherein said job control system has an electronic mail system mail box and said electronic mail system has a mail server with an electronic mail box, so that the job control means is independent of the format/code of the mail server and the job control system stores electronic mail independently of the structure of the user system.

20. The apparatus of claim 1, wherein said job control system enters a wait state until selection criteria is met for at least one of the host computers and stores the job offer type of electronic mail during the wait state.

21. The apparatus of claim 1, wherein said job control system interprets the job offer type of electronic mail to issue commands to the computer system, and generates job electronic mail from data received from the computer system.

22. The apparatus of claim 1, further including the mail system having a dedicated computer, a plurality of electronic mail terminals and job electronic mail storage.

23. The apparatus of claim 1, further including the electronic mail system having format/code conversion means for converting at least one of the format and code of data passing through the electronic mail system.

24. The apparatus of claim 1, wherein said job control system, in response to a single job request by the job offer type of electronic mail, first selects a host computer for job execution and issues a job execution command to the selected host computer, thereafter monitors the selected host computer as to job execution progress, and when execution trouble or error occurs in the selected host computer, selects another host computer and issues a job execution command for executing the job of the single job request.

25. The apparatus of claim 1, wherein said job control system monitors turnaround time of job execution for each host computer with respect to each of a plurality of job classes; and wherein said job control system analyzes the job offer type of electronic mail to determine the job class of the job offer type of electronic mail, and selects one of the host computers of the computer system in dependence upon comparison of the turnaround times of at least some of the host computers with respect to the determined job class.

26. A job executing apparatus, comprising:

a computer system composed of a plurality of host computers;

a user system for issuing electronic mail requesting job execution;

an electronic mail system for transferring the electronic mail;

a job control system;

a transmission system for interconnecting the user system, the job control system, the computer system and the electronic mail system;

the job control system monitoring running of the host computers within the computer system and producing monitoring data with respect to each host computer within the computer system;

said job control system selecting one of the host computers within the computer system as a selected computer with selection being based upon an analysis of the monitoring data of at least some of the host computers; and said job control system issuing a job execution command to the selected computer based upon the requested job execution of the electronic mail.

27. A job executing apparatus, comprising:

a computer system composed of a plurality of host computers;

a user system for issuing electronic mail requesting job execution;

an electronic mail system for transferring the electronic mail;

a job control system;

a transmission system for interconnecting the user system, the computer system, the job control system and the electronic mail system;

the job control system analyzing and converting one of code and format of the electronic mail received from the electronic mail system to generate commands to the computer system; and said job control system analyzing and converting one of code and format of data from the computer system to generate electronic mail for the electronic mail system, so that the computer system is vender independent with respect to the electronic mail and user systems, and so that structure of the computer system is transparent to the electronic mail and user systems.

28. A job executing apparatus, comprising:

a computer system composed of a plurality of host computers;

a user system for issuing electronic mail requesting job execution;

an electronic mail system for transferring the electronic mail;

a job control system;

a transmission system for interconnecting the user system, the computer system, the job control system and the electronic mail system;

the job control system selecting one of the host computers for executing a job within a received electronic mail, with the selection being based upon a comparison of information in the electronic mail and security or authorization levels of host computers.

29. A job executing apparatus, comprising:

a computer system composed of a plurality of host computers;

a user system for issuing electronic mail requesting job execution;

an electronic mail system for transferring the electronic mail;

a job control system;

a transmission system for interconnecting the user system, the computer system, the job control system and the electronic mail system;

the job control system monitoring, at fixed periodic intervals, a turnaround time of job execution on each of the host computers within the computer system; and said job control system selecting one of the host computers for execution of a job within the electronic mail from the user system with the selection being based upon a comparison of turnaround time of at least some of the host computers.

30. A job executing apparatus, comprising:

a computer system composed of a plurality of host computers;

a user system for issuing electronic mail requesting job execution;

an electronic mail system for transferring the electronic mail;

a job control system;

a transmission system for interconnecting the user system, the computer system, the job control system and the electronic mail system;

the job control system extracting an execution time from the electronic mail issued by the user system; and said job control system interrupting execution of a host computer based upon the execution time and issuing an execution command for execution of a job within the electronic mail, with the issuing being to the interrupted host computer.

31. A job executing apparatus, comprising:

a plurality of host computers;

a user system for issuing electronic mail requesting job execution;

an electronic mail system for transferring the electronic mail;

a job control system;

a transmission system for interconnecting the user system, the computer system, the job control system and the electronic mail system;

the job control system analyzing the electronic mail from the user system; and said job control system, based upon the analyzing, determining whether or not a job execution result type of electronic mail is to be issued to the electronic mail system.

32. A job executing apparatus, comprising:

a computer system composed of a plurality of host computers;

a user system for issuing electronic mail requesting job execution;

an electronic mail system for transferring the electronic mail;

a job control system a transmission system for interconnecting the user system, the computer system, the job control system and the electronic mail system;

the job control system receiving the electronic mail from the user system through the electronic mail system; and said job control system entering a wait state after receiving the electronic mail until selection criteria is met by at least one of the host computers and storing the electronic mail during the wait state.

33. A job executing apparatus, comprising:

a computer system composed of a plurality of host computers;

a user system for issuing electronic mail requesting job execution;

an electronic mail system for transferring the electronic mail;

a job control system;

a transmission system for interconnecting the user system, the computer system, the job control system and the electronic mail system;

the job control system monitoring execution within a host computer of a job defined by the electronic mail; and said job control system in response to execution trouble or error occurring within the host computer executing the job, selecting another host computer and issuing a job execution command for executing the job in the selected another host computer.

34. A system for connection with an electronic mail system having an electronic mail terminal, comprising:

a computer system for executing jobs when running;

a monitor system monitoring the running of said computer system; and a job control system receiving electronic job mail from the electronic mail system, generating a command for executing the a job defined in the electronic job mail, and sending the command to said computer system in response to the monitoring.

35. A system as set forth in claim 34, wherein said computer system includes a plurality of job execution computers, and wherein said job control system includes select means for selecting one of said job execution computers for executing the command, with the selecting being in response to said monitor system monitoring individual running of said job execution computers.

36. A system as set forth in claim 35, wherein said select means selects said one of said job execution computers from among said job execution computers that are determined by said monitor system to be running.

37. A system as set forth in claim 35, wherein said select means selects said one of said job execution computers in dependence upon individual loads upon said job execution computers as determined by said monitor system.

38. A system as set forth in claim 34, wherein said job control system receives the electronic job mail from the electronic mail terminal independently of running of said computer system.

39. A system as set forth in claim 34, wherein said job control system registers electronic mail system discriminators that are assigned to a plurality of entities using the electronic mail system, and when an electronic mail system discriminator contained in the electronic job mail is not registered, said job control system prevents execution of the electronic job mail by the computer system.

40. A system as set forth in claim 34, wherein said job control system stores a correspondence between a plurality of computer system discriminators and a plurality of electronic mail discriminators that are individually assigned to identify a plurality of senders requesting jobs by using the electronic mail system, and said job control system converting an electronic mail discriminator contained in received electronic job mail into a corresponding one of the computer system discriminators by using the stored correspondence.

41. A system as set forth in claim 34, wherein said job control system includes means for starting a job in the computer system at a job starting time that is derived from the electronic job mail.

42. A system as set forth in claim 34, wherein said job control system includes means for determining an estimated execution end time of executing a job of the electronic job mail and sending through the electronic mail system a status type of electronic mail addressed to a sender of the electronic job mail for informing the sender of the estimated execution end time.

43. A system as set forth in claim 34, wherein said job control system includes means for monitoring progress of executing the electronic job mail by said computer system and for sending through the electronic mail system a status type of electronic mail informing a sender of the electronic job mail of the progress in response to the electronic job mail.

44. A system as set forth in claim 34, wherein said job control system includes means for requesting and receiving through the electronic mail system data type of electronic mail containing input data for executing a job defined by the electronic job mail at s time of executing the job in said computer system.

45. A system as set forth in claim 34, wherein said job control system includes means for converting the electronic job mail into job control language, JCL, of said computer system.

46. A system as set forth in claim 34, wherein said electronic mail system includes an electronic mail box, and means for reading the electronic job mail from said electronic mail box and sending the electronic job mail to said job control system.

47. A system as set forth in claim 34, wherein said job control system includes means for reading the electronic job mail from an electronic mail box in the electronic mail system.

48. A system as set forth in claim 34, wherein said computer system includes means for starting a batch job generated within the computer system, and wherein said computer system includes means for registering both a job started by said job control means and the batch job commonly in a job awaiting queue.

49. A system as set forth in claim 34, wherein said computer system transfers an execution result, of executing a job of the electronic job mail, to said job control system, and wherein said job control system includes means for transferring the execution result as a part of electronic mail to said electronic mail terminal through said electronic mail system.

50. A system as set forth in claim 49, wherein said computer system includes means for extracting the execution result from a spool file when the job execution is ended, and for adding format control information intrinsic to said computer system to the execution result, wherein said job control system includes means for transferring the execution result and format control information to said electronic mail system, and wherein said electronic mail system includes means for converting the format control information into format control information intrinsic to said electronic mail system, and for registering a result of the converting in a private box of an electronic mail box of said electronic mail system.

51. A system as set forth in claim 34, wherein the electronic job mail contains distribution information for identifying a method of distributing a result of executing a job of the electronic mail job, and wherein said job control system includes means for determining a private electronic mail box for registering the result of executing as a part of electronic mail, with the determining being on a basis of the distribution information.

52. A system as set forth in claim 51, wherein said means for determining, in response to the distribution information, selects the method among simultaneous distribution for distributing to all the users in a group simultaneously, and a circular distribution for serially distributing to the users in a group in an appointed order and in a correctable manner.

53. A system as set forth in claim 51, wherein said job control system includes means for distributing the result of executing to the electronic mail system at a time dependent upon information in the electronic job mail.

54. A job executing method, comprising:

receiving an electronic mail defining a job, with the receiving being by a distribution determining computer;

determining a distribution within the electronic mail system of an execution result of executing the job of the electronic mail with said determining being when the electronic mail is received from a TSS (Time Sharing System) terminal, said determining being performed by the distribution determining computer, and said determining being prior to the executing of the job of the electronic mail by an execution computer that is different from the distribution computer, and issuing a job execution result with said issuing being according to the distribution, said issuing being by electronic mail at the end of execution of the job by the execution computer, and said issuing being on the basis of said determining.

55. A job executing method as set forth in claim 54, including distributing the execution result by an electronic mail system mounted on a computer that is different from the distribution computer and the execution computer.

56. A job executing method as set forth in claim 54, including monitoring running of the execution computer, and generating electronic mail containing the execution result in accordance with said monitoring under control of the distribution computer.

57. A job executing method as set forth in claim 54, including sending the execution result to the distribution computer from the execution computer.

58. A job executing system, comprising:

a computer system for executing jobs;

a TSS (Time Sharing System) terminal connected with said computer system;

an electronic mail system mounted on a first computer;

means for monitoring running of said computer system;

means for receiving a job defining electronic mail from said TSS terminal, determining from the job defining electronic mail a request to have an execution result sent by the electronic mail system, and providing a job, defined in the job defining electronic mail, to said computer system for execution by the computer system to produce an execution result; and means responsive to said determining for generating electronic mail that includes the execution result and distributing the electronic mail that includes the execution result through said electronic mail system.

59. A job executing system, comprising:

a computer system for executing jobs;

a TSS (Time Sharing System) terminal connected with said computer system;

an electronic mail system mounted on a first computer;

a monitor for monitoring running of said computer system;

in response to receiving a job defining electronic mail from said TSS terminal, said first computer determining from the job defining electronic mail a request to have an execution result sent by the electronic mail system, and providing a job, defined in the job defining electronic mail, to said computer system for execution by the computer system to produce an execution result; and in response to the determining, said first computer generating electronic mail that includes the execution result and distributing the electronic mail that includes the execution result through said electronic mail system.

* * * * *